United States Patent [19]
Held et al.

[11] Patent Number: 5,802,367
[45] Date of Patent: Sep. 1, 1998

[54] METHOD AND SYSTEM FOR TRANSPARENTLY EXECUTING CODE USING A SURROGATE PROCESS

[75] Inventors: Andrew F. Held, Kirkland; Edward K. Jung, Bellevue; Paul Leach, Seattle; Pradyumna K. Misra, Issaquah; Richard K. Sailor, Bellevue; Michael R. C. Seaman, Kirkland; Nathaniel S. Brown, Bellevue, all of Wash.

[73] Assignee: Microsoft Corporation, Redmond, Wash.

[21] Appl. No.: 585,511

[22] Filed: Jan. 16, 1996

Related U.S. Application Data

[63] Continuation of Ser. No. 499,417, Jul. 7, 1995.
[51] Int. Cl.$^6$ .................................................. G06F 9/40
[52] U.S. Cl. ................................................... 395/685
[58] Field of Search ................................. 395/684, 685

[56] References Cited

U.S. PATENT DOCUMENTS

| | | | |
|---|---|---|---|
| 5,253,297 | 10/1993 | Press | 380/49 |
| 5,606,493 | 2/1997 | Duscher et al. | 364/134 |
| 5,625,823 | 4/1997 | Debenedictis et al. | 395/706 |

OTHER PUBLICATIONS

Finnegan, James, "Building Window NT–Based Client/Server Applications Using Remote Procedure Calls", Microsoft Systems Journal, pp. (25), Oct. 1994.
Goodman, Kevin J., "Windows NT: A Developer's Guide", M&T Books, pp. (3), Chapter 7, 1994.
Prosise, Jeff, "Integrate Your Applications with he Windows 95 User Interface Using Shell Extensions", Microsoft Systems Journal, pp. (56), Mar. 1995.
"Microsoft Win32 Preliminary SDK for Windows NT Programmer's Guide," *Microsoft Corporation*, pp. 1–32, 1992.
Custer, Helen "Inside Windows NT," *Microsoft Press*, pp. 315–320, 1993.

*Primary Examiner*—Alvin E. Oberley
*Assistant Examiner*—St. John Courtenay, III
*Attorney, Agent, or Firm*—Seed and Berry LLP

[57] ABSTRACT

A method and system for transparently executing code using a surrogate process is provided. In a preferred embodiment, the underlying system provides a surrogate program that can execute server dynamic-link libraries. When a client program wishes to access an object of a sharable class or a class factory object, the client program requests a service control manager to execute the server code for the sharable class. In response, the service control manager determines from a registration database whether the server code is available in the form of a server executable or a server dynamic-link library. If the server code is implemented as a server dynamic-link library, the service control manager either returns the location of the server dynamic-link library to the client program to be run in the execution context of the client program or the service control manager launches the surrogate program and requests it to load the server dynamic-link library, thereby isolating the server dynamic-link library from the client program execution context. When the surrogate process is launched, the surrogate process loads the requested server dynamic-link library and instantiates class factory objects corresponding to the sharable classes implemented by the server dynamic-link library. In one embodiment, multiple server dynamic-link libraries can be loaded within the same surrogate process. According to this embodiment, when the client program requests access to an object of a sharable class or to a class factory object, the service control manager determines whether the server code that implements the object can be loaded in a surrogate process that is already executing or whether a new surrogate process needs to be launched. Once the server dynamic-link library is loaded in the surrogate process and a reference to a server object returned to the client program, the client program can communicate with the server code in the same manner as if the server code had been loaded into the execution context of the client program.

56 Claims, 13 Drawing Sheets

METHOD AND SYSTEM FOR TRANSPARENTLY EXECUTING CODE USING A SURROGATE PROCESS

CROSS-REFERENCE TO RELATED APPLICATION

This application is a continuation of U.S. patent application Ser. No. 08/499,417, filed Jul. 7, 1995.

TECHNICAL FIELD

This invention relates generally to a computer method and system for invoking code and, more specifically, to a method and system for transparently executing a dynamic-link library in a surrogate process.

BACKGROUND OF THE INVENTION

In some computing environments, code to be shared among several client programs is implemented in an executable module called a library. A library can be either a static-link library or a dynamic-link library (a "DLL"). Static-link libraries require the code contained in the executable module to be copied into a client program executable image before the client program is executed. Thus, each client program has its own copy of the executable module and the static-link library has access to the client program code and data. In contrast to static-link libraries, several client programs can share a single copy of the code contained in a DLL, which saves memory space. The loading and linking of the DLL is performed as the program executes. In some implementations, information regarding the location of the shared code in the DLL is placed in the executable image of each client program for later access. Setting up this access is referred to as loading, even though the code image is not copied. Typically, DLLs are executed in the context of the calling code; that is, the DLL can access the code, data space, and the stack space of the client program that invoked a function contained in the DLL. Therefore, DLLs like static-link libraries have access to the client program execution context. As a result, potential security problems are created in that errant or ill-behaved code in a dynamic-link library can corrupt portions of the client program context in which the library is being executed.

In an object-oriented environment, the code implementing the various available objects can be used by multiple client programs. Objects are typically implemented by server code that provides the behavior of the object. (An introduction to object-oriented concepts is discussed further below.) Client programs wishing to create, incorporate, or share objects implemented by server code are required to access and execute the appropriate server code. One current solution is for the server code implementing each object to be executed always as a separate process. Each client program that requires access invokes the server code as a separate process and then sends requests to the server code using any standard, well-known interprocess communication mechanism. However, invoking the server code for each object as a separate process generates a large overhead of memory and other resource usage. Alternatively, some object-oriented systems require that all object server code is implemented in a static or dynamic-link library, which is loaded into each client process that desires to access the object implemented by the server code. As described earlier, one disadvantage of requiring a client process to load object server code into the client program's context is that potential security problems arise. As another alternative, other object-oriented systems provide an intermediary process that is used by each client program to access server code. The intermediary process determines whether to run the server code as a separate process or to load it into the intermediary process. The disadvantage to this approach is that each client program needs to be aware of whether the server code is being accessed through an intermediary process or is loaded into the execution context of the client process, because different communication mechanisms are provided in each case. Also, an additional level of indirection is required to access the services of the server code when the server code is accessed through an intermediary process.

The present invention is described below using some object-oriented techniques; thus, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a programmer-defined type. A class declaration describes the data members and function members of the class. A function member is also referred to as a method of a class. The data members and function members of a class are bound together in that the function operates on an instance (an allocated occurrence) of the class. An instance of a class is also called an object of the class or an object instance. Thus, a class provides a definition for a group of objects with similar properties and common behavior.

To allocate storage for an object of a particular class (type), an object is instantiated (an instance of the class is created). Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 1 is a block diagram illustrating typical data structures used to represent an object. An object is composed of instance data (data members) and function members, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to models described in U.S. Pat. No. 5,297,284, entitled "A Method for Implementing Virtual Functions and Virtual Bases in a Compiler for an Object Oriented Programming Language," which is hereby incorporated by reference. One skilled in the art would appreciate that other object models can be defined.

An advantage of using object-oriented techniques is that these techniques can be used to facilitate the sharing of objects. For example, server code implementing the function members of an instantiated object can share the object with multiple client programs. To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for independent pieces of code (or programs) to communicate. Interfaces are typically used for deriving new classes: a server program or other server code defines new classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

FIG. 2 is a symbolic representation of an object. In the following description, an object data structure is represented by the shape 201 labeled with the interfaces through which the object may be accessed. As shown, object 201 supports IInterface1 and IInterface2.

When a client program desires to use an object, the client program needs access to the server code that implements the interfaces for the sharable object (the class code for the derived class). To access the class code for the derived class, each class implementation that is to be accessible (sharable) is given a unique class identifier (a "CLSID"). For example, sharable code implementing a spreadsheet object that supports the ISpreadsheet interface developed by Microsoft Corporation may have a class identifier of "MSSpreadsheet," while sharable code implementing a spreadsheet object that supports the ISpreadsheet interface developed by another corporation may have a class identifier of "LTSSpreadsheet." A persistent registry (also referred to as a registration database) in each computer system is maintained that maps each CLSID to the server code that implements the sharable class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

SUMMARY OF THE INVENTION

The limitations of prior systems are overcome by the present invention, which is a method and system for transparently executing code using a surrogate process. In a preferred embodiment, a surrogate program is provided for loading a server dynamic-link library when the surrogate program is launched. In one embodiment, the surrogate program also creates instances of the class factory object supported by the server dynamic-link library and registers them in a registration table. Once instances of the class factory object have been registered, a client program can communicate with them directly without being aware of whether they have been instantiated in a surrogate process or not. In this manner, the protection afforded by loading the server code in a surrogate process is provided transparently to the client program.

In another embodiment of the invention, a client program requests creation of or access to an object or a class factory object. A service control manager, provided by the underlying system, responds to the client program request by launching a server executable, by returning the location of a server dynamic-link library ("DLL"), or by launching a surrogate program as a surrogate process and requesting it to load the server DLL. If a surrogate process is launched, the surrogate process loads the requested server DLL and creates and registers class factory objects corresponding to the sharable classes implemented by the server DLL.

In another embodiment, the client program controls whether a server dynamic-link library is executed in a surrogate process or in the client program execution context.

In another embodiment, a launched surrogate process instantiates a requested object and returns a pointer to a requested interface of that object instance. This interface pointer can be used by the client program to access the server DLL executing in the surrogate process in the same manner the client program would access the server DLL using the interface pointer had the server DLL been loaded into the execution context of the client program.

In another embodiment, the surrogate process is executed remotely in a network environment. A client program on a client node requests a client service control manager to access or create a particular object. The client service control manager then determines upon which node the server code should be executed and forwards the request to a server service control manager on the determined network node. The server service control manager on the server node launches a surrogate process and requests the surrogate process to load the requested server code corresponding to the object in the client program request.

In another embodiment, multiple server DLLs can be loaded in a single surrogate process. The code that invokes the server code determines whether a particular surrogate process can be reused to load another server DLL. According to one scheme, this determination is based upon the security identity of the requesting client program and the compatibility of the server DLLs from a security standpoint.

In another embodiment, a surrogate process is used to load a server DLL during the unmarshalling of an interface pointer.

DETAILED DESCRIPTION OF THE INVENTION

Figure 1:
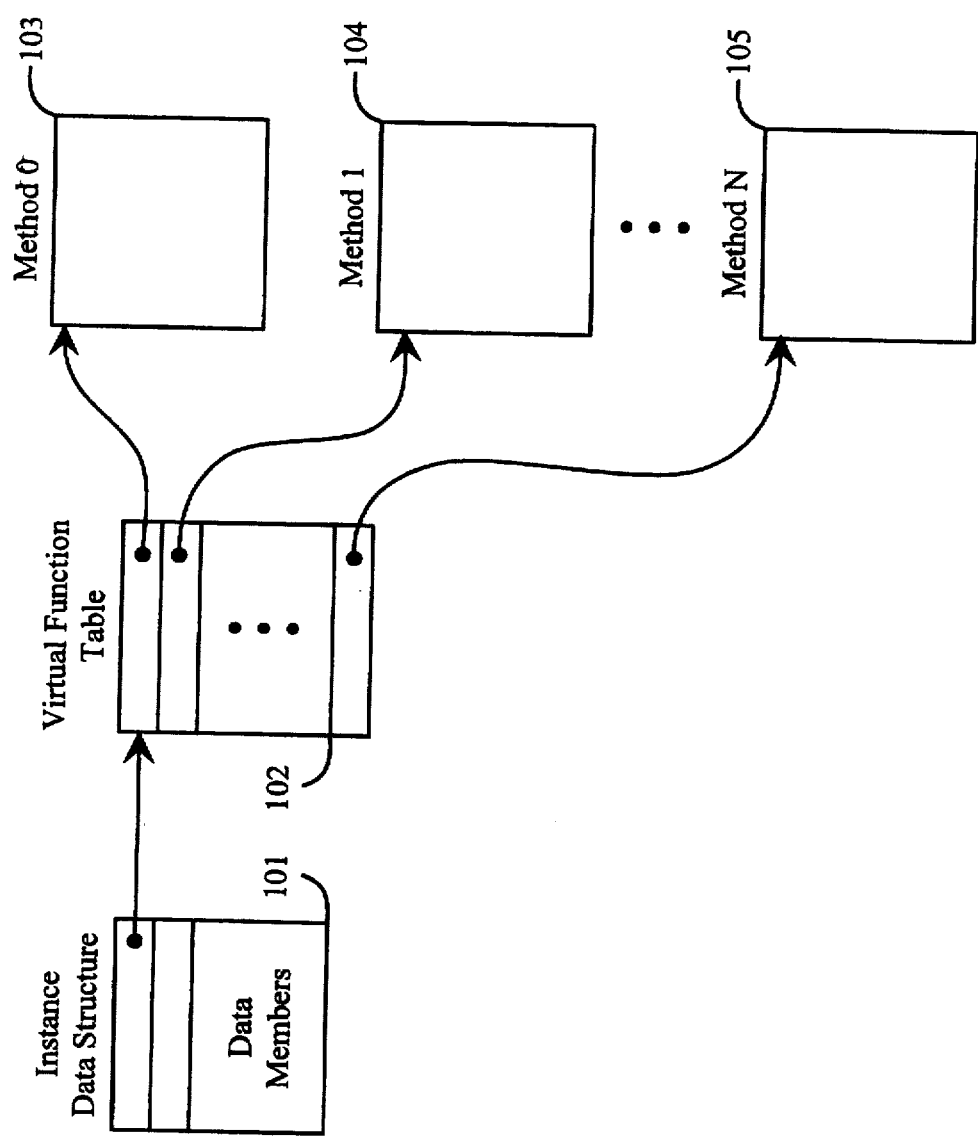
FIG. 1 is a block diagram illustrating typical data structures used to represent an object.
Figure 2:
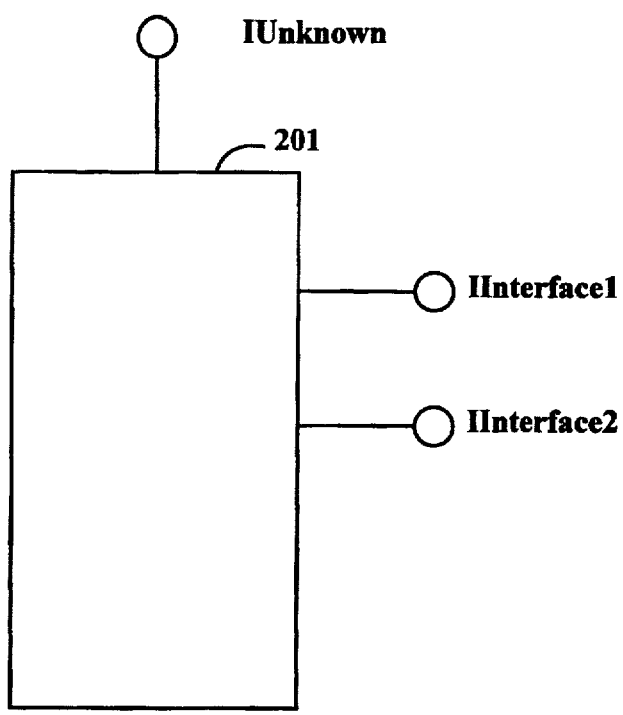
FIG. 2 is a symbolic representation of an object.

Embodiments of the present invention provide methods and systems for executing server code in a surrogate process. In an object-oriented environment, each sharable class of objects has server code (class code) that implements the behavior for the class of objects that can be instantiated. Each sharable class of objects has a corresponding class identifier (CLSID) that uniquely identifies the class for external access. More than one class can be implemented by the same server module. A client program requests services from the server code to help implement the behavior of the client program. The server code may be provided in several forms, including a dynamic-link library (DLL) or an independently executable program (e.g., an .EXE file). Server code stored in a DLL is referred to as a server DLL and independently executable server code is referred to as a server executable. One skilled in the art will recognize that server code could be provided in other forms as well. For this reason, the code provided to support a class of objects is referred to as server code and not as a server program or server application.

A surrogate process is an independently executable program that can be used to execute a server DLL in an execution context (e.g., address space) that is separate from the execution context of the requesting client program. To execute a server DLL, the surrogate process is launched and then requested to load the server DLL. Thus, the use of a surrogate process allows a requesting client program to isolate untrusted or unknown server DLL code from the client program's code and data. In a typical object-oriented environment where many objects are shared among many client programs, the ability to ensure integrity by isolating server DLL code in a separate process is paramount. The ability to execute a server DLL in a surrogate process is useful whenever a client program desires to invoke a server DLL, including during the execution of object binding routines that create (or activate) and access objects. In addition, the ability to execute a server DLL in a surrogate process allows server code available solely in DLL form to be executed remotely on a computer network because it can then be executed in a separate process.

Also, the ability to execute a server DLL in a surrogate process is useful to protect server code from client code. For example, an author of a server application that implements a database with direct access to the data can implement the server application as a server DLL. Then, to protect the server DLL from malicious or ill-behaved client code, the server DLL can be executed in a surrogate process.

In addition, the ability to execute a server DLL in a surrogate process allows server code that is implemented according to a different architecture model than the client program to be isolated from the client program. For example, a server DLL may be implemented according to a different threading model than the client program. (A threading model refers to the synchronization of "simultaneous" execution paths within a process.) Running the server DLL with a different threading model in a separate process prevents interference with thread synchronization in the client process. Also, a server DLL may be implemented according to a different machine instruction set than the client program. For example, the client program may be written for the Intel 80x86 architecture while the server DLL may be written for the Digital Equipment Corporation Alpha architecture. Since DLLs written for one architecture typically cannot execute in a process executing another architecture, a surrogate process which loads the server DLL can be run on a different computer that corresponds to the instruction set of the server DLL (DEC Alpha) while the client process runs on a computer with the client's instruction architecture. Alternately, a surrogate process which emulates the server DLLs execution environment (DEC Alpha) can load the server DLL on the same computer as the client program. In both cases, the surrogate thus provides the client program with transparent access to the server DLL.

Figure 3:
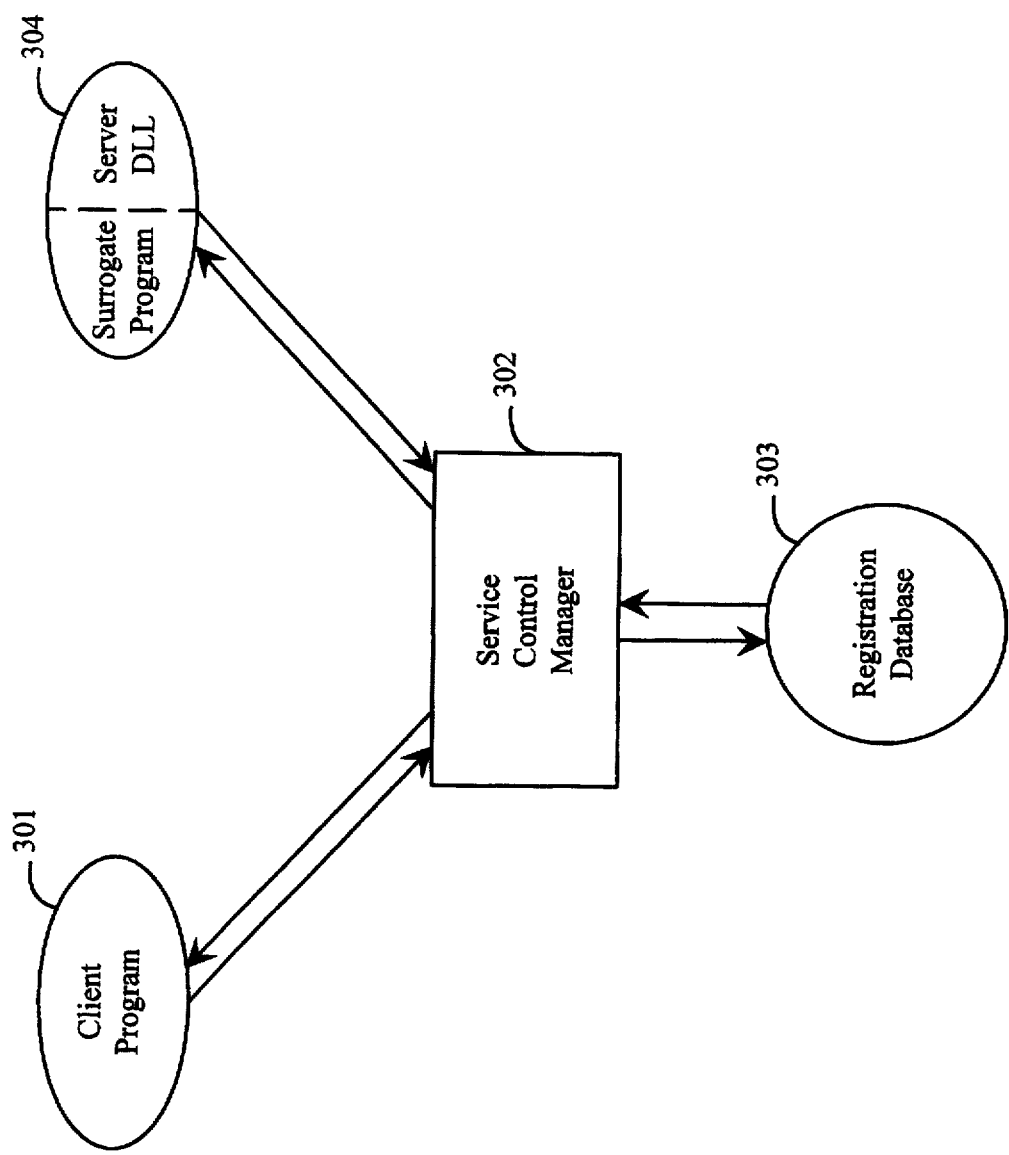
FIG. 3 is an overview block diagram illustrating object activation using a surrogate process.

FIG. 3 is an overview block diagram illustrating object activation using a surrogate process. FIG. 3 illustrates a client program 301, a service control manager 302, a registration database 303, and a surrogate program 304 with a server DLL loaded. The service control manager 302 is provided by the underlying environment (e.g., operating system, window system, object-oriented environment, or similar underlying system code) to assist client programs in locating, launching, and executing server code. The service control manager may be implemented as a separate process that is executed whenever its services are needed. The registration database 303 contains persistently stored information regarding the requirements, preferences, and capabilities of the server code used to implement objects of sharable classes. For example, the pathname of the executable module for the server code for a sharable class of objects may be stored in the registration database 303.

Referring to FIG. 3, when the client program 301 wishes to access an object of a sharable class, the client program 301 requests the service control manager 302 to execute the server code for the corresponding class. In response, service control manager 302 determines from the registration database 303 whether the server code is available in the form of a server executable or a server DLL. If the server code is available as a server executable, then service control manager 302 launches the server executable directly. If the server code is available as a server DLL, service control manager 302 can either (1) return the location of the server DLL (e.g., the pathname) to the client program 301 to allow the client program load the server DLL into its own execution context, or (2) launch the surrogate program 304 if not already launched and request the surrogate program 304 to load the server DLL in order to isolate the server DLL from the client program 301 execution context.

When server code is available as a server DLL, multiple schemes can be used to determine whether the server DLL should be run in the client program execution context or in a separate surrogate process. One scheme allows the client program, when it requests the service control manager to execute the server code for a particular object or a new object, to specify that if the server code is a server DLL, then the server DLL should be run in a surrogate process. In an alternative scheme, service control manager maintains a database containing information that indicates which server DLLs have "trusted" code and which have "untrusted" code or code with unknown security attributes. This information could be stored, for example, in the registration database. According to this scheme, when the service control manager is requested to execute a server DLL that contains trusted code, then the service control manager returns the server DLL location to the client program and the client program loads the DLL into its own execution context. Alternatively, when the server DLL contains untrusted or unknown code, the service control manager causes the server DLL to be loaded in the execution context of a surrogate process. Yet, as another alternative, the server DLL specifies, e.g., in the registration database, that it always should be run in a surrogate process regardless of client program specified desires. One skilled in the art will recognize that other schemes exist for determining when a server DLL should be executed in a surrogate process (e.g., all server DLLs execute in a surrogate process) and that combinations of these schemes are possible.

Once a service control manager determines that a server DLL needs to be executed in a surrogate process, the service control manager accesses the appropriate surrogate process or launches a new surrogate process. The service control manager requests the surrogate process to load the server DLL and to create instances of the class factory objects for the sharable classes supported by the server DLL. A class factory object is an object that can be used to create objects of the class corresponding to a particular CLSID. Thus, for each sharable class of objects, there exists a class factory object that can be used to instantiate objects of that class. In response to the service control manager request, the surrogate process loads the requested server DLL, creates instances of the requested class factory objects, registers the class factory objects in a registration table accessible to other code and processes, instantiates an object of one of the implemented classes if requested, and returns a reference to the originally requested object. Once the reference to the originally requested object is returned to the client program, the client program has access to the object instantiated in the surrogate process using the identical techniques (protocols) used to communicate with the object if the object were instead instantiated within the execution context of the client program. Thus, the client program need not have knowledge whether a particular server is being accessed in a surrogate process or not.

Embodiments of the present invention enable multiple server DLLs to be loaded into a single surrogate process, as well as a single server DLL to be loaded per surrogate process. A complex matrix of factors can be supported for determining whether or not a particular surrogate process can be used to execute a particular server DLL. This decision support matrix can be implemented by any well-known method for implementing a matrix, such as an array data structure. For example, in a computing environment where different security identities are used for running programs, the decision of whether to use a particular surrogate process to load a particular server DLL may depend on the similarity of the security identity of the client program requesting the server DLL to the security identities of the other client programs using server DLLs already loaded within the particular surrogate process. A security identity is used by the computer system to ensure that only certain code can access data, code, and system resources that require a defined level of authorization before access is permitted. If the code to be executed has a security identity with the proper authorization specified, then access to protected data, code, and resources is permitted.

A security identity is typically operating system dependent. For example, a security identity can be viewed as a user account (user ID) and a password. There are many ways to implement the specification of a security identity. In one embodiment, the server code specifies user IDs in a persistent registry and corresponding passwords in a secured database. When a system service or client program executes server code, it can use the information in the persistent registry and secured database to execute the server code using the security identity of the requesting client program.

In a preferred embodiment, the methods and systems of the present invention are implemented on a computer system comprising a central processing unit, a display, a memory, and input/output devices. The preferred embodiment is designed to operate in an object-oriented environment, such as an environment that supports the Microsoft OLE 2.0 ("OLE") protocol established by Microsoft Corporation in Redmond, Wash. One skilled in the art will also recognize that embodiments of the present invention can be practiced in a non-object-oriented environment as well.

Figure 4:
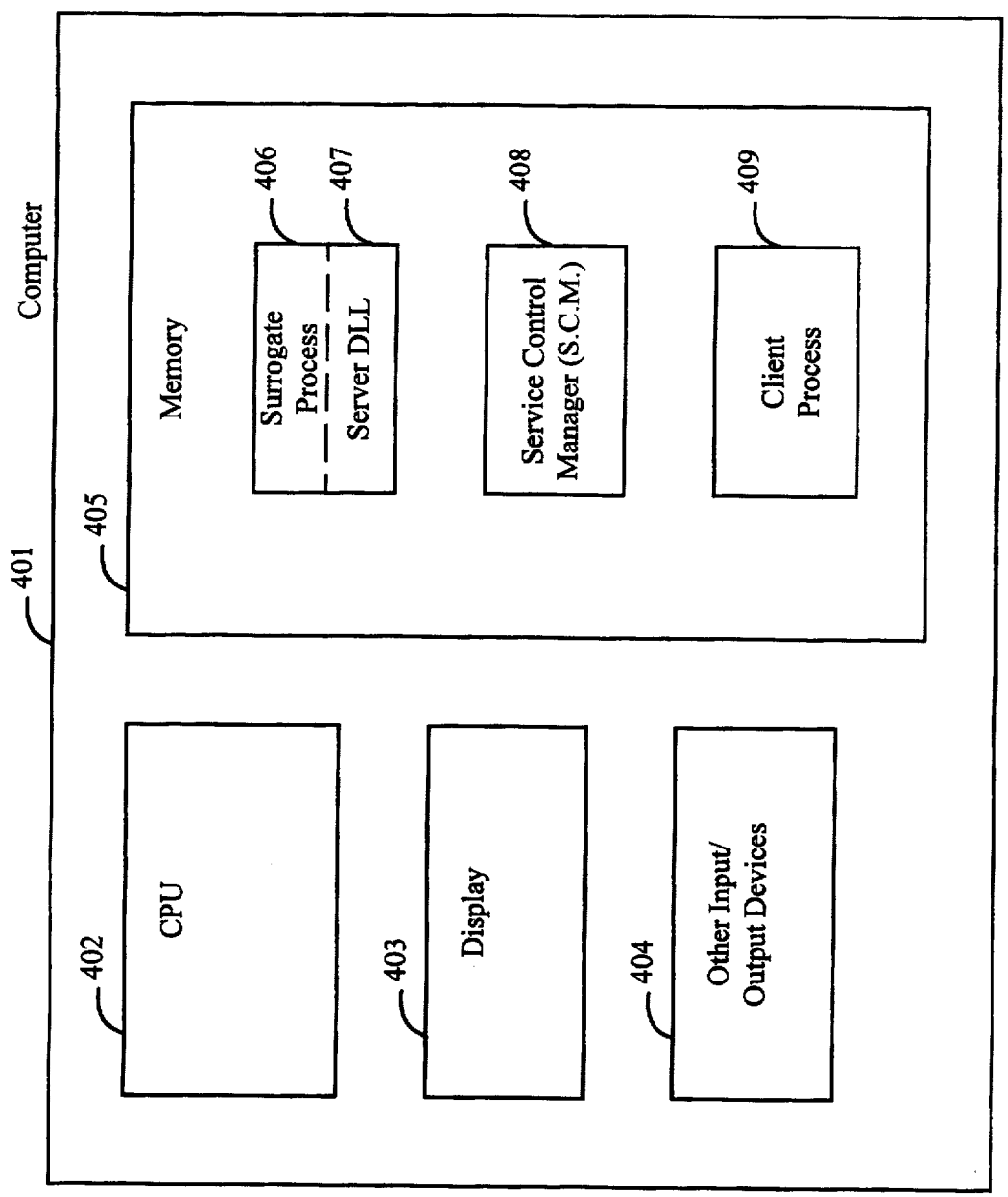
FIG. 4 is a block diagram of a general purpose computer system for practicing a preferred embodiment of the present invention.

FIG. 4 is a block diagram of a general purpose computer system for practicing a preferred embodiment of the present invention. The computer system 401 contains a central processing unit (CPU) 402, a display 403, input/output devices 404, and a computer memory (memory) 405. The surrogate process, as well as other executing programs, preferably reside in the memory and execute on the CPU 402. The surrogate process 406 is shown after loading server DLL code 407. The service control manager (SCM) 408 also resides in the computer memory 405, as well as the executing client program 409. One skilled in the art will realize that the present invention can be implemented in a distributed environment, where more than one computer system is used to communicate with other computer systems.

In one aspect of the invention, a preferred embodiment provides a surrogate program that can be launched and invoked by a service control manager transparently on behalf of a client program. In one embodiment, the client program requests that server DLLs be loaded into a surrogate process. However, one skilled in the art will recognize that the decision whether to load a server DLL in a surrogate process can be made independently of a client program request.

Figure 5:
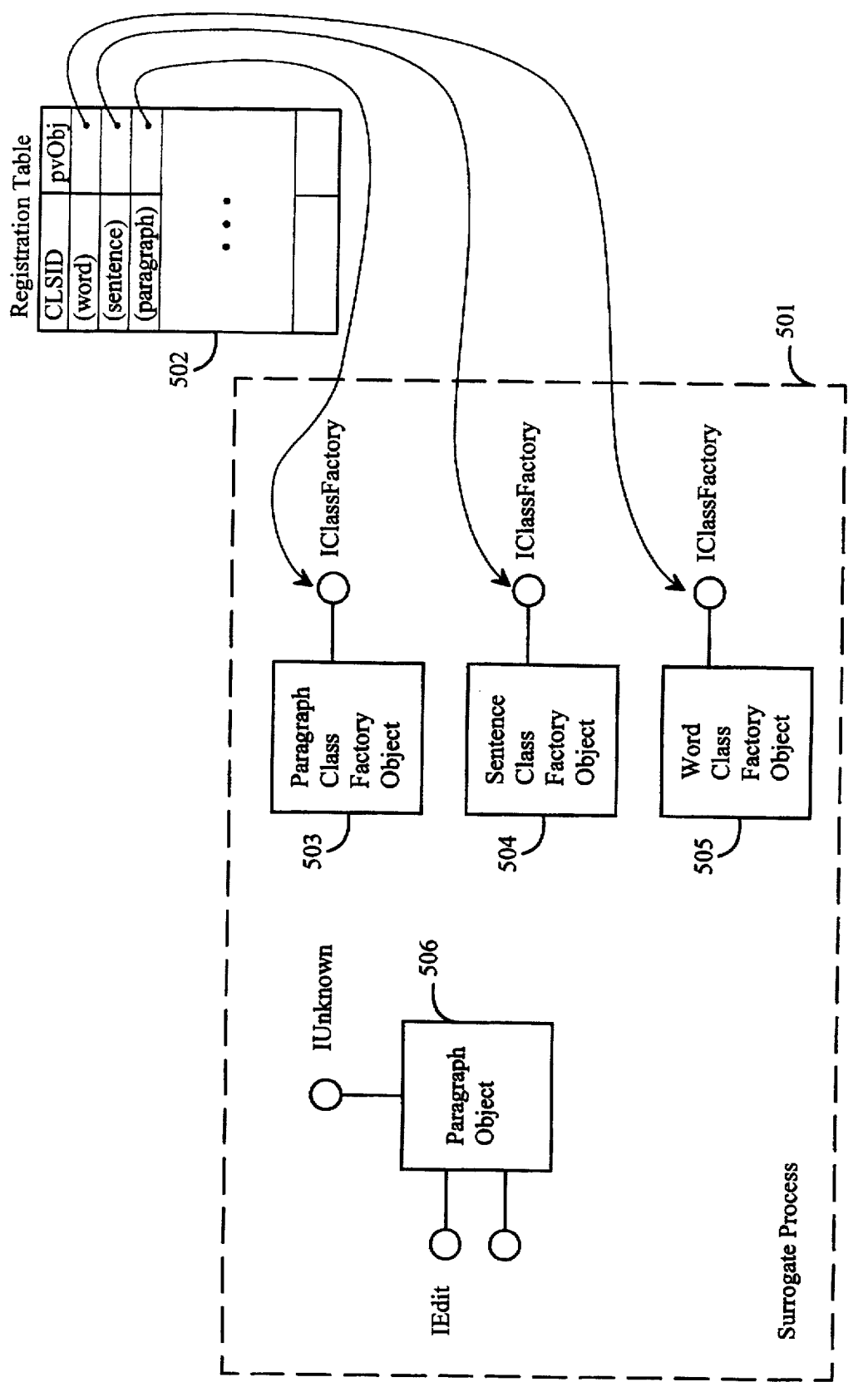
FIG. 5 is a-block diagram illustrating sample data structures of a surrogate process after loading and initializing a server DLL.

FIG. 5 is a block diagram illustrating sample data structures of a surrogate process after loading and initializing a server DLL. In this example, the server DLL supports word-processing capabilities and implements three sharable classes: a paragraph, a sentence, and a word class. The client application has requested the creation of and access to a new instance of a paragraph object. After the server DLL is loaded by the surrogate process 501, the surrogate process 501 invokes server DLL code to instantiate a class factory object for each sharable class implemented by the server DLL. Thus, in FIG. 5, class factory objects 503, 504, and 505 are instantiated for the paragraph, sentence and word classes, respectively. Once these class factory objects are instantiated, the surrogate process 501 registers them in the registration database 502. As shown, the registration database 502 contains entries referencing the instantiated class factory objects 503, 504, and 505 in the surrogate process 501. At this point, the surrogate process 501 can return a reference to one of the class factory objects or can instantiate one of the sharable classes and load in existing data (to access an existing object) or initialize the instantiated object as a new object. Because in this example the client application has requested a new instance of a paragraph object, the surrogate process 501 uses the instantiated class factory object 503 for the paragraph class to instantiate a new paragraph object 506. The surrogate process 501 then returns to the requesting client program a reference to the instantiated paragraph object 506.

In a preferred embodiment, in order to instantiate objects of a sharable class, the corresponding class factory object implements an IClassFactory interface which contains a method for creating an object of the corresponding sharable class. This method is referred to as the CreateInstance method. When invoked, the CreateInstance method creates an object of the sharable class (identified by a CLSID) by allocating the appropriate data structure storage and virtual function tables for the supported interfaces.

Specifically, each server is responsible for providing a class factory object that implements the IClassFactory interface for each sharable class of objects that the server implements. Thus, a word-processing server that supports paragraph, sentence, and word objects (corresponding, for example, to sharable classes identified by CLSID_PARAGRAPH, CLSID_SENTENCE, and CLSID_WORD) provides three class factory objects that implement the IClassFactory interface for a paragraph object, a sentence object, and a word object, respectively. Once a client program has access to the class factory object corresponding to a particular sharable class (identified by a particular CLSID), the client program can then instantiate any number of objects of that sharable class. Preferably, each server instantiates a class factory object for each of the sharable classes it supports and registers these class factory objects to enable client programs to access them.

Thus, returning to the example of the word-processing server loaded in the surrogate process shown in FIG. 5, when the surrogate program 501 is launched, it instantiates a paragraph class factory object 503, a sentence class factory object 504, and a word class factor object 505. The surrogate process 501 then registers these class factory objects (for example, with the service control manager) which results in placing references to them in the registration table 502. Later, when a client program wishes to instantiate a word object, the client program queries the service control manager for a handle to the registered word class factory object and then invokes the CreateInstance method of its IClassFactory interface to instantiate a word object. The client program can then initialize this instance or load in persistent data.

If the service control manager is implemented as a separate process, then the client program queries the service control manager for the handle to the object through well-known interprocess communication mechanisms. For example, in one embodiment, the client program sends a remote procedure call ("RPC") to the service control manager. The underlying system that implements the RPC mechanism typically blocks execution in the client program until the function call returns. Alternatively, the process may communicate using message passing techniques that involve handshaking requests and acknowledgments.

Also, one skilled in the art will recognize that alternative embodiments exist for creating (instantiating) objects of sharable classes. For example, in one embodiment, the IClassFactory interface (or any interface with an equivalent method to the CreateInstance method) is implemented by each sharable class. Each server defines a function that returns an initialized object for a requested sharable class instead of returning a separate class factory object. The client program then can use that object to create other objects of the same class. Thus, according to this scheme, each object acts as its own "class factory."

A. Using a Surrogate Process in a Network Environment

Figure 6:
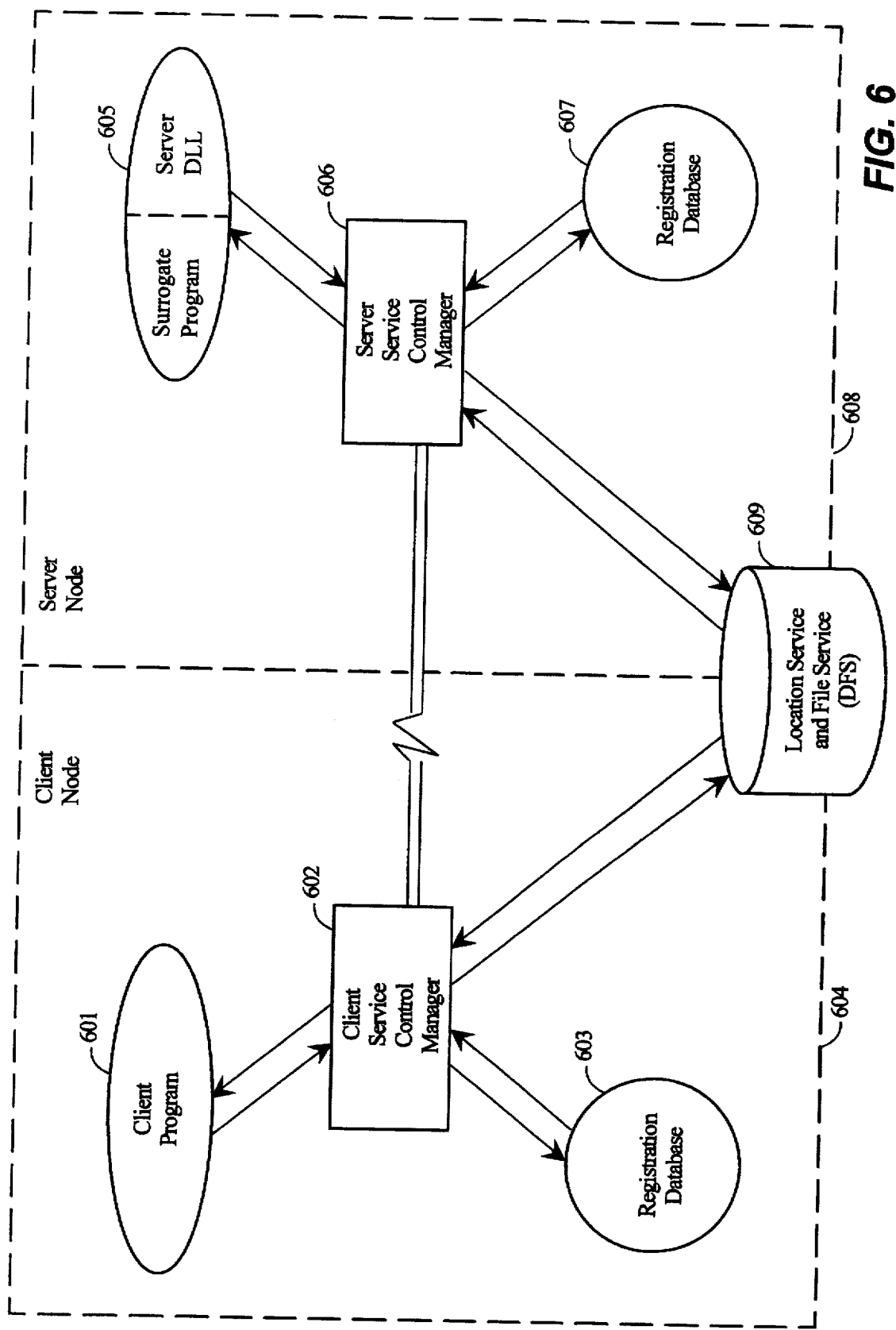
FIG. 6 is an overview block diagram illustrating object activation using a surrogate process in a network environment.

As mentioned, a surrogate process can be used to execute a server DLL on a remote computer system in a network. FIG. 6 is an overview block diagram illustrating object activation using a surrogate process in a network environment. The client node 604 accesses an object of a sharable class through a server DLL that is loaded into the surrogate process 605 on the server node 608. The client node 604 includes a client program 601, a client service control manager 602, and a registration database 603. The server node 608 includes a server service control manager 606, a registration database 607, and a surrogate process 605 that has loaded a server DLL. In addition, the computer system includes network file services for accessing files and location services for determining the network address of specified code or data or the network address of a named node. In a preferred embodiment, these services are provided by a distributed file system 609 ("DFS"). One skilled in the art would recognize that there are other ways to provide such services (e.g., a centralized file system server).

To remotely access either a new object or an existing object of a sharable class or to access a class factory object for instantiating such an object, the client program 601 sends an activation request to the client service control manager 602 to activate an object corresponding to a particular sharable class. In one embodiment, the client service control manager 602 is a separate process launched on the client node whenever its services are needed. Note that whether a service control manager is viewed as a client service control manager or a server service control manager depends upon the direction of the current request being processed. A service control manager can act in either capacity or both capacities simultaneously. In this embodiment, the client program 601 communicates with the client service control manager 602 through local remote procedure call ("RPC") mechanisms. (A "local" RPC request refers to the calling of a procedure on the same node but in a different process.) When required, the client service control manager 602 looks up information in the registration database 603 to determine the network node location of server code corresponding to the activation request. Also, when required, the client service control manager 602 asks the DFS 609 to return a server node network address for given a network pathname. Once the client service control manager 602 knows with which network node to communicate, the client service control manager 602 establishes a remote connection, using standard well-known RPC mechanisms, to the server service control manager 606 on the determined network node corresponding to the activation request. (If the client service control manager 602 determines that the server code needs to execute locally, then the client service control manager 602 communicates directly using local RPC mechanisms with a server executable or with a surrogate process that has loaded the server DLL as described with reference to FIG.

5.) In its communication, the client service control manager 602 forwards all of the information in the activation request to the server service control manager 606. The server service control manager 606 then consults the registration database 607 (and possibly the DFS 609) to find the proper server executable or server DLL. If necessary, the server service control manager 606 launches the surrogate process 605, which loads the server DLL. The surrogate process 605 then performs whatever tasks are necessary to activate the class factory object or a new or existing object of the requested sharable class. Finally, the surrogate process 605 marshals a pointer to the requested object into a packet and sends the packet to the client program 601 through the server service control manager 606 and the client service control manager 602. When the client program 601 receives the packet, it unmarshals the pointer and is then able to access the activated object.

Marshalling and unmarshalling are mechanisms for passing pointers to objects between processes. They are defined in copending U.S. Pat. No. 5,511,197 entitled "A METHOD AND SYSTEM FOR NETWORK MARSHALLING OF INTERFACE POINTERS FOR REMOTE PROCEDURE CALLS," which is hereby incorporated by reference. Basically, a program uses marshalling to package a pointer to an interface into a packet (flat data stream) that can be sent across processes. The packet includes information identifying the server node and process for response communication (it provides callback capability). When an interface pointer is marshalled, a stub object is created in the server or surrogate process. The stub object knows how to access and invoke the actual function members of the server code. When a client process receives a marshalled interface pointer, it unmarshals the pointer and creates an interface proxy object in its own address space. The proxy object contains function entry points for all of the function members of the interface, but each function implementation simply forwards the call via RPC mechanisms to the stub object through the callback. The marshalling process creates the proxy and the stub objects and connects them for future communication.

B. Using a Surrogate Process to Access a Class Factory Object

Figure 7A:
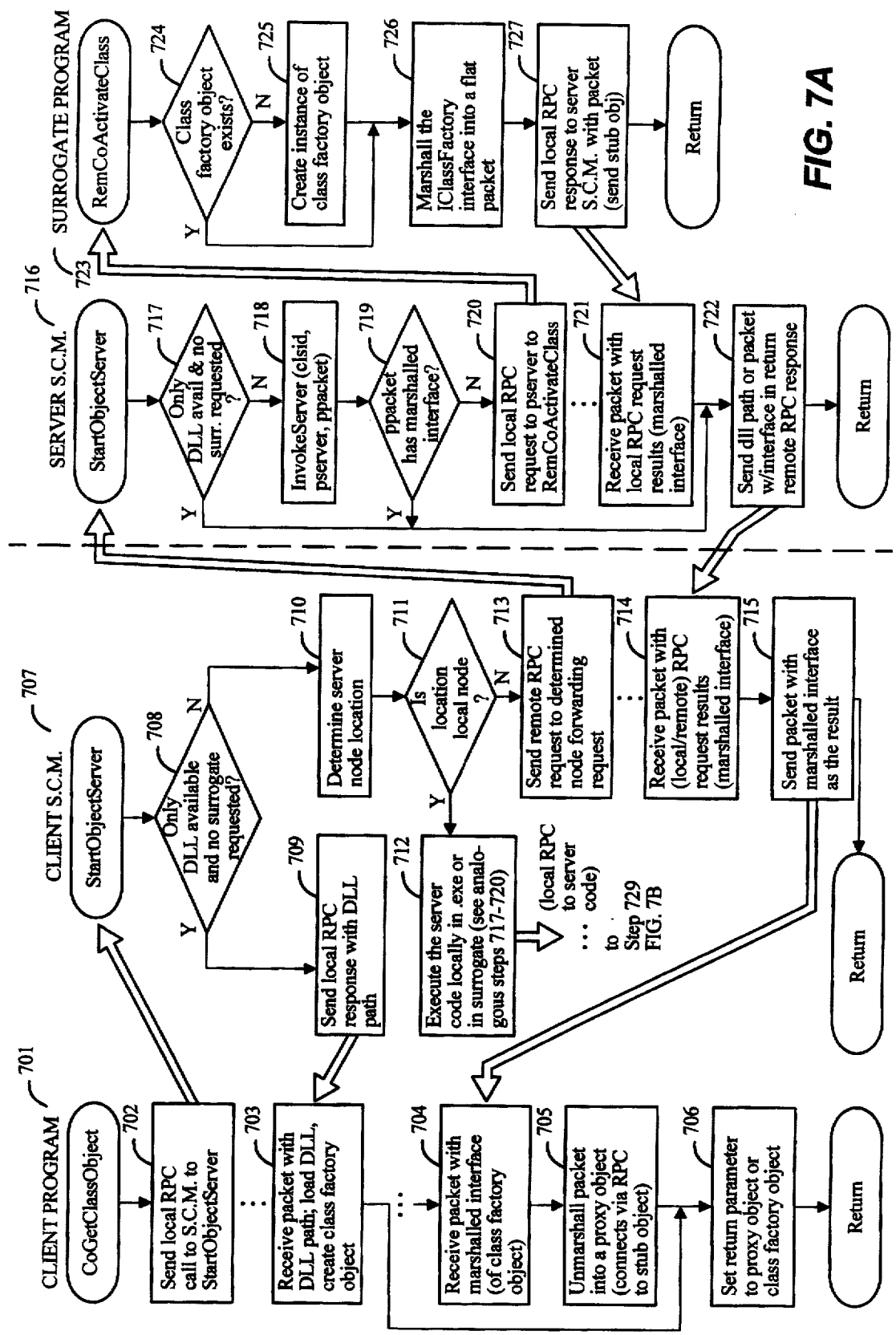
FIG. 7A is a flow diagram of the communication path for accessing a class factory object that is implemented in a server DLL to be executed on a remote node.

FIG. 7A is a flow diagram of the communication path for accessing a class factory object that is implemented in a server DLL to be executed on a remote node. As described earlier, a class factory object is used by a client program to create an object of a sharable class using the IClassFactory interface of the class factory object. The IClassFactory interface provides a method, CreateInstance, for creating objects of the sharable class. All objects created using the same CreateInstance method have the same class and thus are implemented by the same server code.

FIG. 7A illustrates the communication flow when the server code is implemented as a DLL and is to be loaded in a surrogate process or when the server code is launched as a server executable. In particular, FIG. 7A shows the communication between four different processes: a client program 701, a client service control manager 707 (labeled Client SCM), a server service control manager 716 (labeled Server SCM), and a surrogate program 723. (If a server executable is launched instead of a surrogate program, then the fourth process would be labeled "server executable" 723, but the steps executed by that process would remain the same.) The dashed line in the figure indicates network node boundaries. The client program 701 and the client service control manager 707 reside on the client node, and the server service control manager 716 and the surrogate program 723 reside on the server node. As described with reference to FIG. 6, the client program 701 requests activation of a class factory object from the client service control manager 707, and the client service control manager 707 forwards the request to the proper server service control manager 716, after determining with which server service control manager to communicate. The server service control manager 716 then invokes the server code corresponding to the requested class factory object. The server service control manager 716 invokes the server code as an independent process (a server executable) or launches the surrogate program (invokes a surrogate process) and requests the surrogate process to load the server DLL. In the case where a surrogate process is invoked, the server service control manager 716 determines whether it can use an existing surrogate process or whether it needs to launch a new one. Once the server DLL has been loaded into the surrogate process, the surrogate process 723 creates a class factory object for the requested class and returns a reference to the IClassFactory interface through the two service control managers to the client program 701.

The above description assumes the determined server service control manager resides on a remote server node. If, on the other hand, the client service control manager 707 determines that the server code should execute on the same node as the client program 701, then the client service control manager 707 need not forward the client program request. One skilled in the art will appreciate that the local execution of the server code is analogous to the remote execution and is discussed briefly in FIG. 7B below.

Specifically, in step 702, the client program 701 while executing a function (e.g., CoGetClassObject) sends a request to the client service control manager 707 via a local RPC mechanism to invoke the function StartObjectServer. Upon receiving this RPC request, the client service control manager 707 invokes the function StartObjectServer to determine where and how to execute the server code and sends the appropriate request to the determined server. In step 708, the function StartObjectServer determines if the requested server code is available only in the form of a server DLL and, if so, whether the client program 701 wishes to execute server DLLs in a surrogate process rather than loading them into the client process. If the client program has not requested loading server DLLs in a surrogate process, then the function continues in step 709, else continues in step 710. In certain cases, for example if the server information is not available locally in the registration database, the client service control manager 707 may not be able to determine whether the server code is available only as a DLL. In such cases, this determination is deferred until step 717. In step 709, the function returns the location of the server DLL to the client program 701 for further processing. When the client program 701 receives a packet containing the server DLL location in step 703 of the function CoGetClassObject, the client program then loads the server DLL, creates the requested class factory object, and continues in step 706.

One skilled in the art will recognize that many different ways exist for a client program to indicate to a service control manager that execution of the server code in a surrogate process is desired. For example, the underlying environment may support a separate function for setting this preference for the entire execution of the client program. Alternatively, a parameter that indicates this desire may be part of the call to the function StartObjectServer. In yet other embodiments, regardless of the existence of a client program specified preference, the service control manager may follow a set of rules for determining when to execute server code in a surrogate process. These rules may override the client program preference. Such alternative embodiments and others are compatible with the logic discussed with reference to FIG. 7A.

When a server executable is available or when a server DLL is to be loaded in a surrogate process, then in step 710, the function StartObjectServer determines the desired server node location. In one embodiment, the desired location is based upon information contained in the persistent registry regarding where the server code desires that it be executed, where the server code is located, and any client requested location. This example embodiment is discussed in detail in copending U.S. patent application Ser. No. 08/158,631 entitled "Method and System for Executing Code Remotely," which is hereby incorporated by reference. In step 711, the function determines whether the determined server node is the same as the local node (where the client program 701 is executing) and, if so, continues at step 712, else continues at step 713. In step 712, the function executes analogous steps to steps 717 through 719 to start up the server code locally in a separate process instead of remotely. In step 712, the function ultimately issues a local RPC request to the server code executing locally to request the desired class factory object.

Figure 7B:
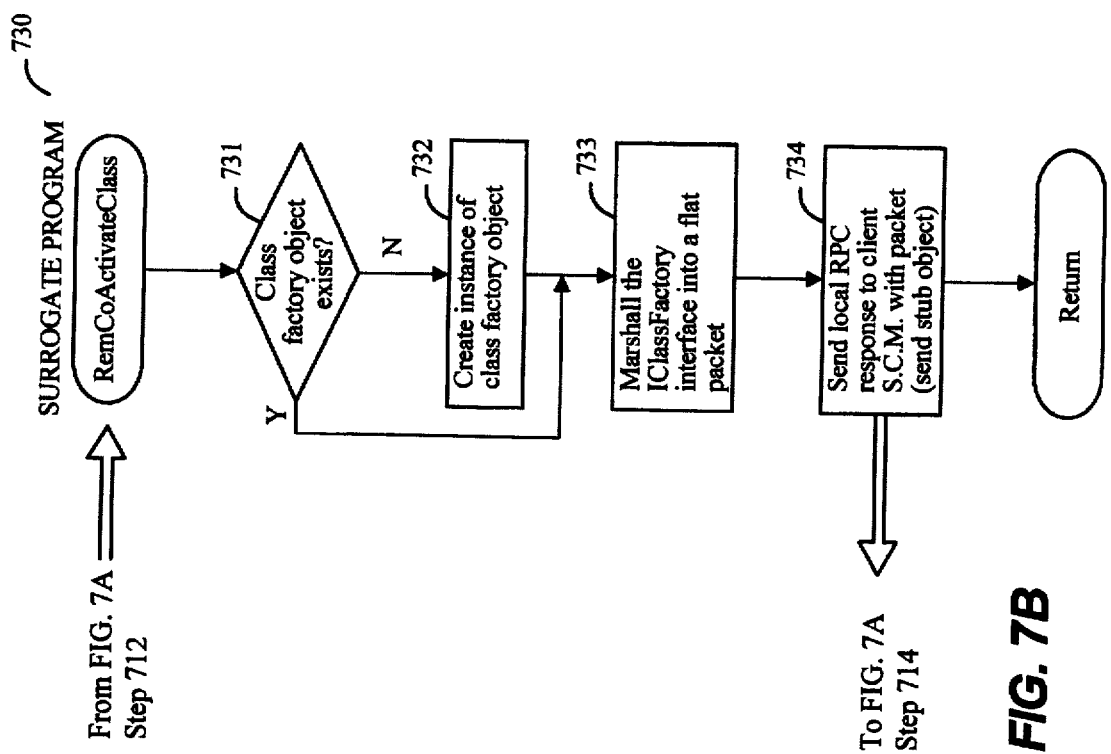
FIG. 7B is a flow diagram of the steps executed by server code executing locally in an independent process.

FIG. 7B is a flow diagram of the steps executed by server code executing locally in an independent process. These steps 731–734 are analogous to steps 724–727 discussed further below. However, the server code executing locally eventually sends a local RPC response to the client service control manager 707 instead of sending a response to the server service control manager 716. Execution then continues in step 714 of FIG. 7A.

If, instead, the determined server node is a remote node, then in step 713, the function sends a request to invoke the StartObjectServer function on the determined server node using a remote RPC mechanism. In this step, the function StartObjectServer forwards the client program request to the appropriate server service control manager.

Upon receiving the request to invoke the StartObjectServer function, the server service control manager 716 on the determined server node invokes the StartObjectServer function. In step 717, the function StartObjectServer determines if the requested server code is only available in the form of a server DLL and, if so, whether execution in a surrogate process has been requested. (Recall from the discussion of step 708 that in certain cases this determination cannot be made on the client node.) If the server code is only available in the form of a server DLL and the use of a surrogate process has not been requested, then the server service control manager 716 will return the location of the server DLL to the client service control manager 707, which will return the server DLL location to the client program 701. The client program 701 is then responsible for loading the server DLL in its own execution context and executing it accordingly. Otherwise, in step 718, the function StartObjectServer calls the function InvokeServer to determine whether to execute the requested server code as a server executable or as a server DLL loaded in a surrogate process. The function InvokeServer launches the server code when necessary and returns a handle to the server code as a launched server executable or as a launched surrogate process with the server DLL loaded. In addition, if the function InvokeServer determines that the server code was already launched and can be reused, then the marshalled interface of the requested class factory object is returned in the parameter "ppacket." (The function InvokeServer is discussed in detail with reference to FIG. 8.) In step 719, the function StartObjectServer checks the output parameter ppacket to determine whether the function InvokeServer has returned a marshalled interface corresponding to the requested class factory object. If so, the function continues in step 722 to send this marshalled interface back to the client program, else continues in step 720. In step 720, the function StartObjectServer sends a request using a local RPC mechanism to the launched surrogate program 723 (or server executable) to invoke the RemCoActivateClass function.

One of the tasks performed by the surrogate process (or server executable) when it is launched is to initialize its own underlying system object support. As part of this process, certain underlying system supplied functions are loaded (preferably as a DLL) into the execution context of the surrogate process and references to entry points corresponding to these system supplied functions are registered with the underlying RPC facility. In this manner, system supplied functions for creating objects of a sharable class or class factory objects can be exposed via the RPC facility to other processes. The RemCoActivateClass function is such a system supplied function that is exposed in this manner. Accordingly, the server service control manager 716 knows how to send the local RPC request to the correct routine in the surrogate process 723 in step 720.

Upon receipt of the RemCoActivateClass request, the surrogate process 723 invokes the underlying system supplied function RemCoActivateClass, which creates an instance of the class factory object if it does not already exist and returns a marshalled version of its IClassFactory interface to the server service control manager 716. Specifically, in step 724, the function RemCoActivateClass determines whether a class factory object already has been created and, if so, continues in step 726, else continues in step 725. Assuming that this code is being executed within the surrogate process 723, in the normal case, the class factory objects have been already instantiated when the surrogate program was launched and loaded the server DLL. However, this function is potentially executed in different situations; hence, steps 724–725 exist for general purposes. In step 725, the function instantiates a class factory object corresponding to the requested sharable class (the function takes as an input parameter a CLSID). In step 726, the function marshals the IClassFactory interface of the instantiated class factory object into a packet. In step 727, the function RemCoActivateClass returns this packet to the server service control manager 716 through the local RPC mechanism.

In turn, the function StartObjectServer, executed by the server service control manager 716, receives the marshalled IClassFactory interface in step 721, and in step 722 forwards the packet to the client service control manager 707. The function StartObjectServer executed by the client service control manager 707 then receives the marshalled packet in step 714 (either from the remote service control manager 716 or from local server code). In step 715, the function StartObjectServer then forwards the packet containing the marshalled IClassFactory interface to the client program 701 through the local RPC mechanism. When the client program 701 receives this packet in step 704 of the function CoGetClassObject, it unmarshals the packet into a proxy object on the client node in step 705. This proxy object implements the IClassFactory interface for the requested class and, during an unmarshalling method call, the proxy object is connected to the stub object corresponding to the same IClassFactory interface on the server node. In step 706, the function CoGetClassObject sets the return parameter designated to contain a pointer to an activated class factory object to this proxy object and returns.

1. Determining and Launching the Proper Surrogate Process

Figure 8:
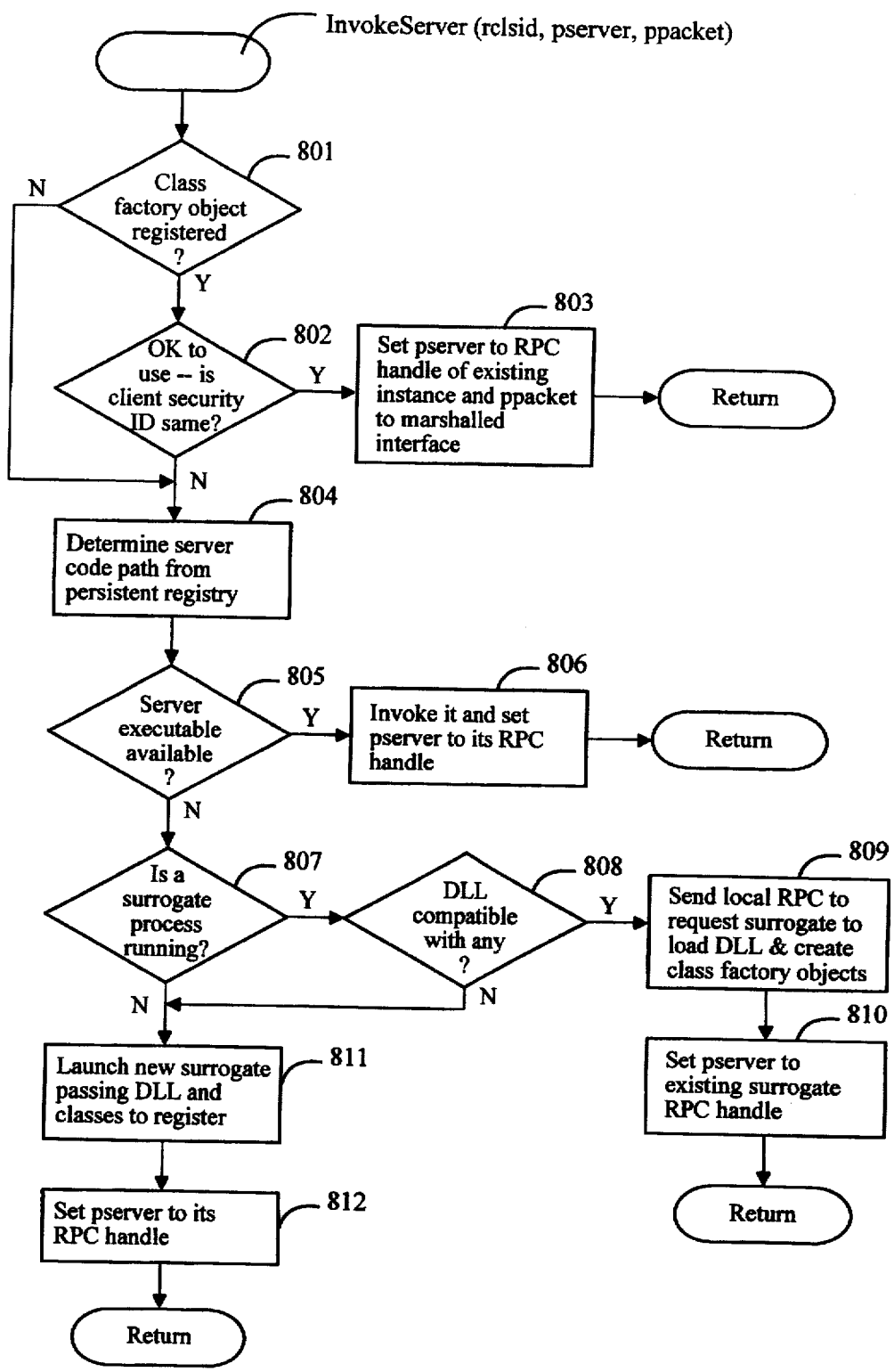
FIG. 8 is flow diagram of the function InvokeServer for invoking server code.

FIG. 8 is a flow diagram of the function InvokeServer for invoking server code. This function is called by the server service control manager 716 (in FIG. 7A) to invoke the proper executable code, loading a server DLL if necessary, and to return a handle to the invoked server code. Once the handle to the invoked server code is received, the server service control manager 716 uses this handle to request the server executable or the appropriate surrogate process with the server DLL loaded to create and return a marshalled instance of the IClassFactory interface of the class factory object corresponding to the requested sharable class.

The function has one input parameter and two output parameters. Input parameter rclsid contains a client program specified CLSID to request a particular class factory object. Output parameter pserver contains a handle to the invoked process to enable the requesting program to communicate via RPC with the invoked server code. Output parameter ppacket is a pointer to a marshalled interface instance.

The function InvokeServer determines how to execute the server code based upon information in the persistent registry in combination with information regarding the security attributes of the requesting client program and the server DLL corresponding to the requested class. Although any combination of these attributes is possible, in one embodiment, the function attempts to use an already executing server executable or an already executing surrogate process if the security identity of the requesting client process is the same as the executing server executable or the surrogate process. One skilled in the art would recognize that the security attributes of the requesting client program can be determined by well known mechanisms, such as an additional input parameter or through a table look-up mechanism. In addition to determining whether the security identity of the client program is the same, if a new server DLL is to be loaded in an already executing surrogate process, then the server DLL must be compatible from a security standpoint with each server DLL already loaded in the surrogate process. One way to determine whether two server DLLs are compatible is to provide such information in a compatibility matrix implemented within the persistent registry. Alternatively, each server DLL can provide an entry point for querying whether the server DLL prefers to be loaded in its own surrogate process. One skilled in the art will recognize that other methods for determining DLL compatibility are possible. In a simple case, one server DLL is loaded in each surrogate process.

According to one embodiment, the function InvokeServer first determines whether the requested class factory object is instantiated and registered by looking up the requested CLSID in the registration table. If the class factory object is found, the function attempts to reuse the registered server executable or surrogate process if the requesting client program security identity is the same as the already executing process. Otherwise, the function InvokeServer launches a server executable if it is available or loads the server DLL in either an already executing surrogate process or in a new surrogate process.

Specifically, in step 801, the function InvokeServer determines whether a class factory object corresponding to the CLSID input parameter is instantiated and registered. If so, the function continues in step 802, else continues in step 804. In step 802, the function determines whether the security identity of the requesting client program is the same as the security identity of the code executing as the registered class factory object and, if so, continues in step 803, else continues in step 804. In step 803, the function sets the output parameter containing the server process handle to the RPC handle of the existing class factory object and sets the output parameter corresponding to a marshalled packet to the registered marshalled IClassFactory interface of the existing class factory object, and returns. (The function InvokeServer assumes that if there is a class factory object registered, then the IClassFactory interface of this instance is directly accessible in marshalled form.)

The RPC handle returned is dependent on the underlying system; specifically the communications transport used. For example, it may be a process identifier and a function to call, or a port, or any other well-known mechanism to access a function of the launched process. This RPC handle to the class factory object provides direct access to the object from client code. Therefore, once the client program 701 obtains this RPC handle to the class factory object, it can invoke methods of the object (e.g., CreateInstance) without being aware that the class factory object is instantiated in a surrogate process.

In step 804, when a new process is to be launched, the function InvokeServer looks up in the persistent registry the location information of the server code to be executed. In one embodiment, this information is a specific pathname pointing to a server DLL or a server executable. In step 805, the function determines whether there is a server executable and, if so, continues in step 806, else continues in step 807. In step 806, the function launches the server executable and sets the output parameter containing a server process handle to the RPC handle of the launched server executable, and returns.

In steps 807–812, the function determines which surrogate process to use to load the server DLL and launches a new surrogate process if necessary. In particular, in step 807, the function determines whether a surrogate process is already executing and, if so, continues in step 808, else continues in step 811. In step 808, the function determines whether it can reuse this already executing surrogate process based upon whether the server DLL corresponding to the requested class is compatible with the server DLLs currently loaded in the surrogate process. As mentioned earlier, this compatibility determination can be implemented using various approaches including a look-up table. If the server DLL is compatible, the function continues in step 809, else continues in step 811. In step 809, the function sends a request using the local RPC mechanism to the existing surrogate process to load the appropriate server DLL. In step 810, the function sets the output parameter containing a server process handle to the RPC handle of the existing surrogate process, and returns. In step 811, the function launches a new surrogate process passing the server DLL information and a list of CLSIDs corresponding to the sharable classes implemented by the server DLL whose class factory objects are to be instantiated and registered. Once the new surrogate process has been launched, in step 812, the function sets the output parameter containing a server process handle to the RPC handle of the newly launched surrogate process, and returns. As described above, the returned RPC handle is system dependent and allows direct access by the client program to the instantiated class factory object without the client program being aware that the server code is running in a surrogate process.

A list of CLSIDs indicating which class factory objects are to be instantiated and registered is passed by the server service control manager to the launched surrogate process because, in a preferred embodiment, the service control manager keeps track of which class factory objects are implemented by which server DLLs. Alternatively, each server DLL can provide an entry point to instantiate and create all of the supported class factory objects, but then the service control manager may not easily be able to cache this information. One skilled in the art will recognize that other alternatives are possible.

2. Executing the Surrogate Program

Figure 9:
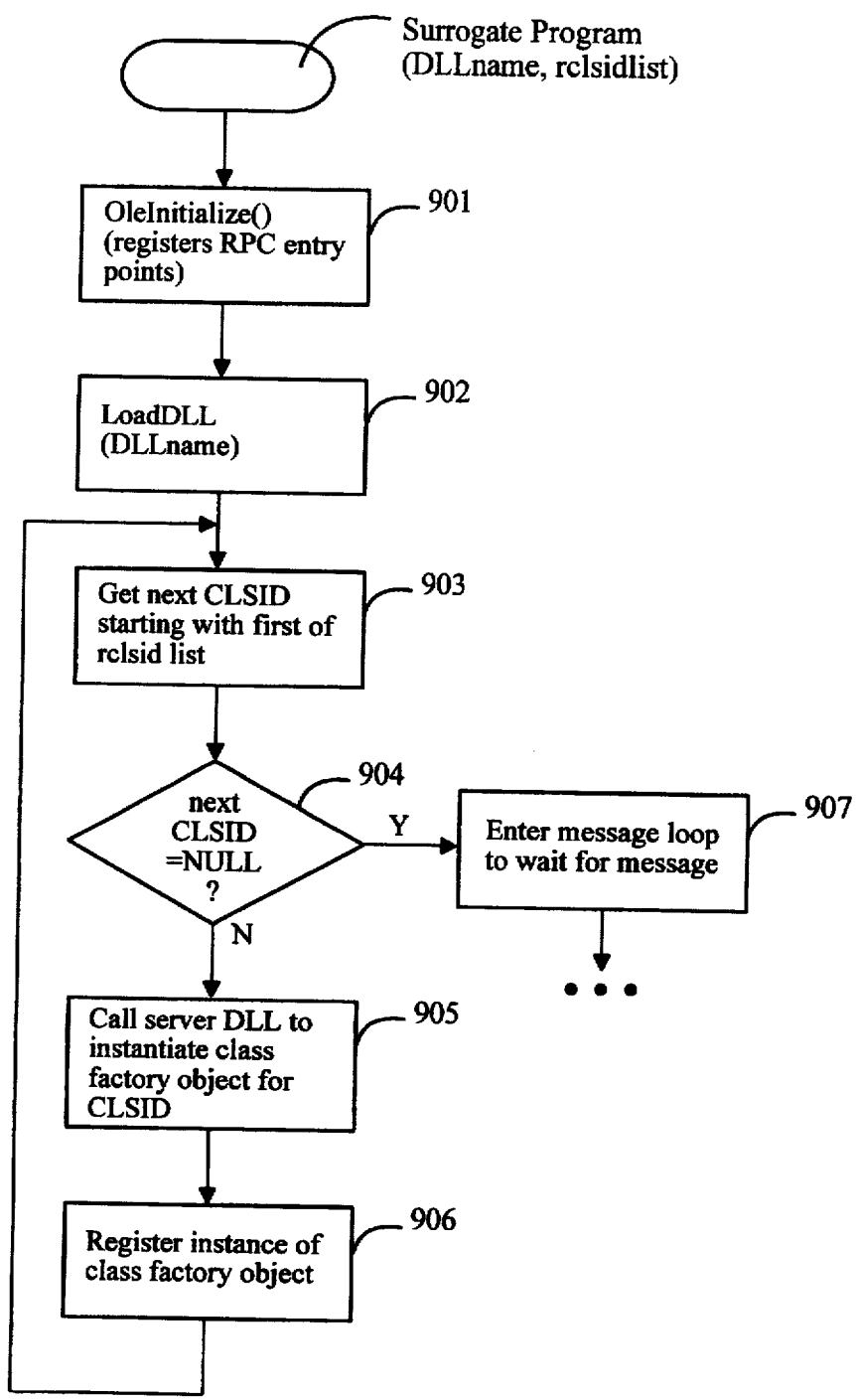
FIG. 9 is a flow diagram of steps executed by a surrogate program when it is launched as a surrogate process.

FIG. 9 is a flow diagram of steps executed by a surrogate program when it is launched as a surrogate process. The program has two input parameters (which are sometimes referred to as command line parameters because they are passed in the command to launch the surrogate program). Parameter DLLname contains the location information for the server DLL to be loaded by the surrogate process. The parameter rclsidlist contains a list of CLSIDs corresponding to the class factory objects to be instantiated and registered.

When the surrogate program is launched, the surrogate program calls a system initialization routine to initialize the underlying object support, loads the requested DLL, and instantiates and registers the requested class factory objects. The program then enters a wait loop until it receives a further event to perform another task, for example, to load another DLL and instantiate and register another set of class factory objects.

Specifically, in step 901 the program calls the underlying system function OleInitialize to load the underlying system support functions (typically provided in the form of a DLL) and to register the entry points of these underlying system functions with the underlying RPC facility. As mentioned earlier, this initialization function conceptually loads the system supplied code in the currently executing process (in this case the surrogate process) and registers pointers to the actual function code with the underlying RPC facility. Through this registration mechanism, these entry points are made available as RPC requests. In step 902, the program loads the server DLL corresponding to the input parameter DLLname. In steps 903–906, the program instantiates and registers a class factory object for each of the CLSIDs in the input parameter rclsidlist. In step 903, the program gets the next CLSID from the input parameter rclsidlist beginning with the first CLSID. In step 904, the program tests to see whether it has reached the end of the list and, if so, continues in step 907, else continues in step 905. In step 905, the program calls a predetermined entry point in the loaded server DLL to instantiate the class factory object for the class identified by the current CLSID. For example, in the Microsoft OLE 2.0 environment, this entry point is DLLGetClassObject. This entry point takes as a parameter a CLSID in order to instantiate the correct class factory object. In step 906, the program registers the class factory object returned by the server DLL code and continues in step 903 at the beginning of the loop. In one embodiment, the step of registering calls a function provided by the underlying system code that was loaded in the initialization step 901 to register the class factory object with the service control manager executing on the same node as the surrogate program. In step 907, the program enters a wait loop until further action is requested.

C. Using a Surrogate to Access an Existing Object

Figure 10:
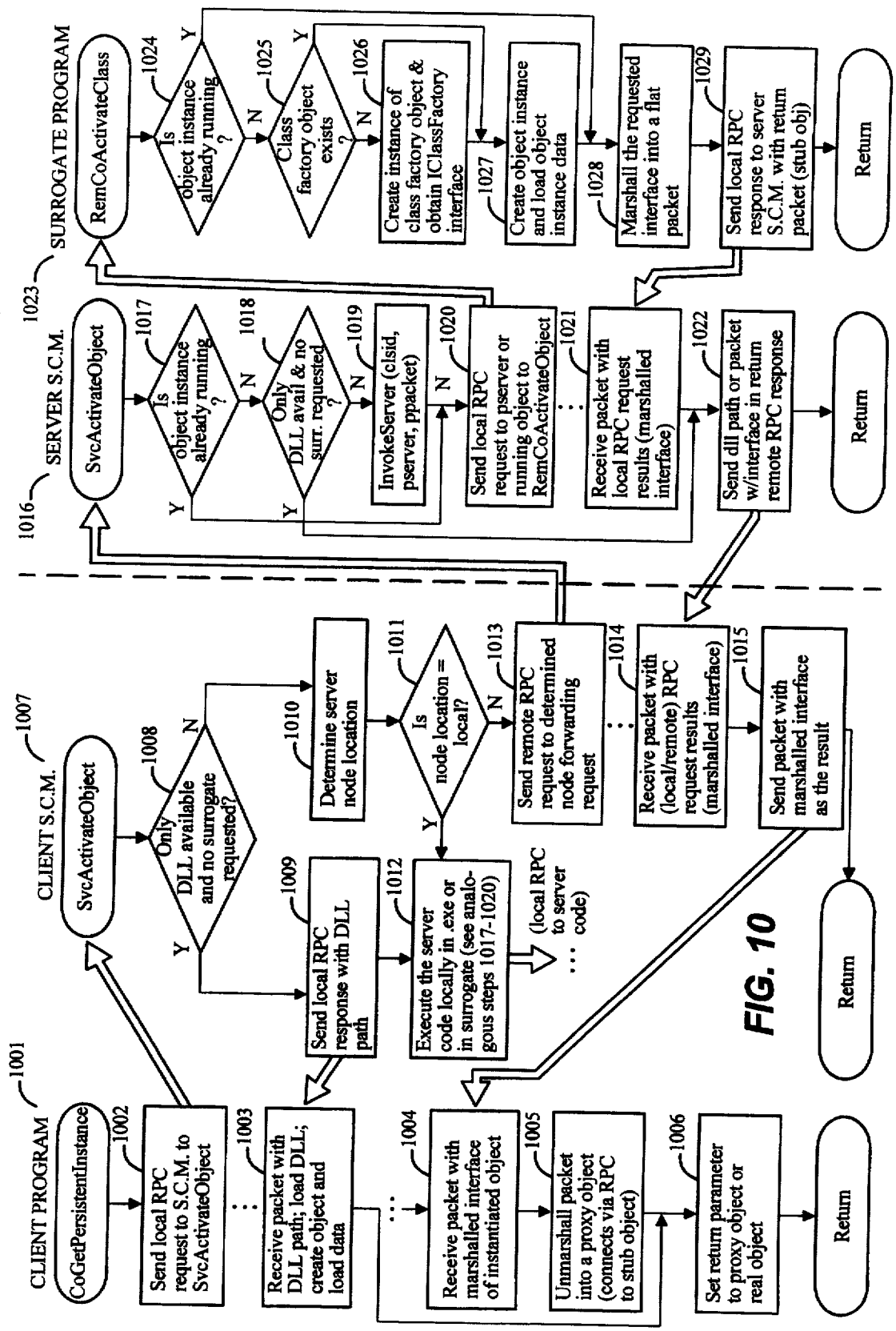
FIG. 10 is a flow diagram of the communication path for accessing an existing object of a sharable class that is implemented in a server DLL to be executed on a remote node.

FIG. 10 is a flow diagram of the communication path for accessing an existing object of a sharable class that is implemented in a server DLL to be executed on a remote node. This communication path is typically encountered when a client program attempts to bind to (activate and access) an already existing object. In a preferred embodiment, the client program 1001 specifies in the bind request a pathname or a pointer to a storage object where the object instance data is persistently stored. This bind request results in the invocation of an underlying system provided function, e.g., CoGetPersistentInstance. The communication path shown in FIG. 10 is fundamentally the same as the communication path described with reference to FIG. 7A, except that different functions are invoked and thus the surrogate program 1022 performs slightly modified tasks. Also the surrogate program 1022 returns an RPC handle to a requested interface of an existing object instead of returning the IClassFactory interface of an instantiated class factory object.

Specifically, the following steps differ from FIG. 7A. In step 1002, the client program 1001 requests invocation of the function SvcActivateObject in the client service control manager 1007. The function SvcActivateObject executed by the client service control manager 1007 performs analogous steps to the function StartObjectServer. However, the function SvcActivateObject executed by the server service control manager 1016 performs slightly different tasks than the function StartObjectServer. As a preliminary step, the function SvcActivateObject executed on the server node determines in step 1017 whether or not the requested existing object instance is already available on the server node. In one embodiment, the function makes this determination by looking at a running object table, which contains references to all of the objects currently instantiated (and registered) on the server machine. If the function determines that the object is instantiated and that the security identity of the client program is the same (or compatible with) the security identity of the process that has instantiated the running object, then the function skips the steps of invoking the server code and continues at step 1020. Otherwise, the function continues in step 1018 to check whether to return the location of the server DLL or to invoke the function InvokeServer as described with reference to FIG. 7A. In step 1020, the function invokes a different entry point in the underlying system supplied code loaded in surrogate process 1023, RemCoActivateObject, to activate the requested object instance.

In an alternate embodiment, if the Running Object Table contains interface pointers and if the requested interface is available in the table, then the server service control manager 1016 need not invoke RemCoActivateObject in the surrogate process 1023. Instead, the server service control manager 1016 skips to step 1022 and returns an RPC handle to the requested interface, which is obtained from the Running Object Table.

The function RemCoActivateObject implemented by the underlying system performs similar tasks to the RemCoActivateClass function discussed with reference to FIG. 7A, except that it returns an RPC handle to the requested interface of an existing object instance instead of the IClassFactory interface for a class factory object. Specifically, in step 1024, if the object is already instantiated and registered (which implies its instance data has already been loaded), then the function continues at step 1028, else it continues at step 1025. In step 1025, the function determines whether the class factory object is already instantiated and registered and, if so, continues in step 1027, else continues in step 1026. In step 1026, the function instantiates a class factory object corresponding to the class of the requested object and obtains its IClassFactory interface. In step 1027, the function creates an instance of the requested object using the IClassFactory interface of the class factory object and loads the object instance data from the pathname or storage object specified originally in the client program request. In step 1028, the function marshals the requested interface into a flat packet. In step 1029, the function then returns this packet to the server service control manager 1016. This packet is then forwarded on to the client program 1001, as described with reference to FIG. 7A.

D. Using a Surrogate to Create and Access a New Object

Figure 11:
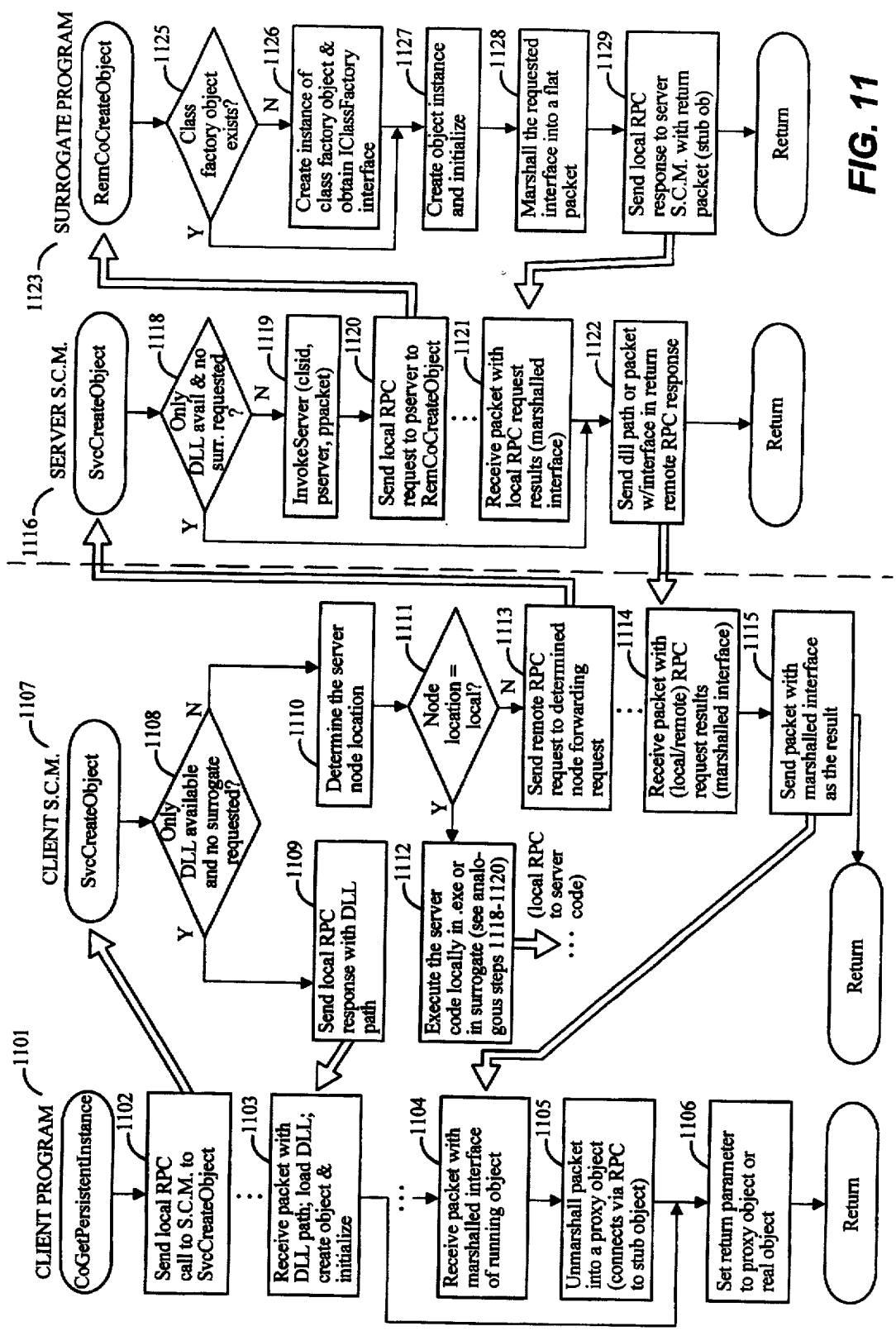
FIG. 11 is a flow diagram of the communication path for instantiating a new object of a sharable class that is implemented in a server DLL to be executed on a remote node.

FIG. 11 is a flow diagram of the communication path for instantiating a new object of a sharable class that is implemented in a server DLL to be executed on a remote node. The communication path shown in FIG. 11 is fundamentally the same as that discussed with reference to FIG. 10, except that different functions are invoked. Also, neither the server service control manager 1116 nor the system supplied code (in the invoked server executable or surrogate program 1123 with the loaded server DLL) check for an existing instance corresponding to the requested object, because the illustrated communication path assumes that a new instance is created for each client program request. However, analogous to the function SvcActivateObject in FIG. 10, the function SvcCreateObject calls InvokeServer to determine whether an executing class factory object that corresponds to the requested sharable class exists and can be reused to avoid launching additional copies of the server code unnecessarily. Another minor difference occurs in step 1127 where the object is initialized with data (if there is initialization data provided) instead of loading instance-specific data. The step numbers labeled in FIG. 11 correspond directly to the analogous step numbers in FIG. 10.

E. Using a Surrogate to Unmarshal an Object

Embodiments of the present invention provide two types of marshalling: standard marshalling and custom marshalling, which are discussed in more detail in copending U.S. parent application Ser. No. 08/158,627. Standard marshalling is marshalling using system supplied routines: the underlying system provides an implementation of the IMarshal interface and the proxy and stub objects and can be used to package and unpackage (marshal and unmarshal) server supplied data or interfaces. Because the underlying system is providing the marshalling support, even though the code is provided as a DLL, the code is trusted code and can be assumed to run successfully in the client program execution context.

Custom marshalling, on the other hand, is marshalling using server supplied routines: the server code provides an implementation of the IMarshal interface and provides proxy and stub DLLs for the server supported interfaces. Thus, if the IMarshal interface is provided by a server DLL, then client programs that load this server DLL or the proxy DLL cannot be insured of data and code integrity. Therefore, when custom marshalling is provided, it may be in the client program's best interest to run the IMarshal code and the proxy DLL in a surrogate process.

Figure 12:
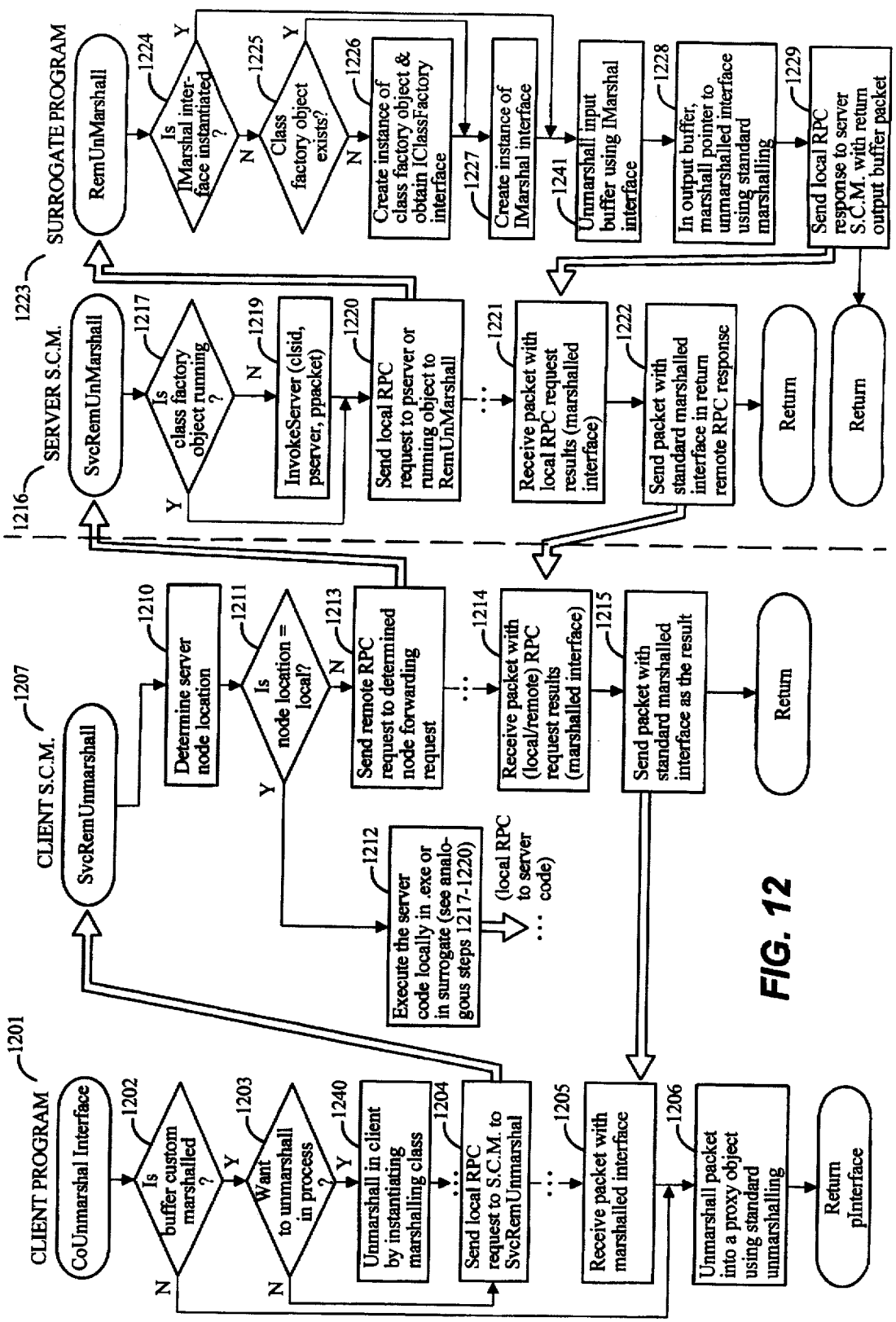
FIG. 12 is a flow diagram of the communication path for custom unmarshalling using a surrogate process.

FIG. 12 is a flow diagram of the communication path for custom unmarshalling using a surrogate process. The communications path shown in FIG. 12 is fundamentally the same as that discussed with reference to FIG. 10, except that different functions are invoked. Also, the service control managers 1207 and 1216 do not need to first determine whether to return the location of the server DLL: the client program 1201 invokes the client service control manager 1207 only after determining that the client program 1201 wants to run the server's custom marshalling code outside its own execution context. Another difference is that the surrogate process 1223 (or the server executable), in addition to instantiating an object, unmarshals a requested buffer (using custom unmarshalling) to create a pointer to an interface.

Specifically, in step 1202, the client program 1201 in the CoUnmarshalInterface function first determines whether the requested buffer (typically passed as an input parameter) requires custom marshalling or standard marshalling. Recall that standard marshalling uses routines supplied by the underlying system and thus can be executed in the execution context of the client program 1201 as trusted code. If the buffer requires custom marshalling, then the function continues in step 1203, else it continues in step 1206. In step 1203, the client program 1201 determines whether custom unmarshalling should be performed in the execution context of the client process. If so, the function continues in step 1240 to load the server DLL for the custom marshalling into the client process and to then perform the unmarshalling. Otherwise, the function continues in step 1204. In step 1204, the client program 1201 requests invocation of the function SvcRemUnmarshal in the client service control manager 1207. The remaining steps 1205–1206 in the client program 1201 are analogous to FIG. 7A.

Also, steps 1210–1215 and steps 1217–1222 in the service control managers are analogous to FIG. 7A except, as mentioned, they do not need to first determine whether to return a location of the server DLL. In addition, they invoke a different function, RemUnMarshal, in the surrogate process 1223.

In addition, steps 1224–1227 and 1228–1230 in the surrogate process 1223 are analogous to the similarly numbered steps in FIG. 7A. The difference is that the class factory object corresponding to the marshalling class is instantiated and the IMarshal interface instead of a requested interface is instantiated. Also, in step 1241 (executed before step 1228) the IMarshal interface instance is used to unmarshal the input buffer passed as a parameter to the RemUnMarshal function. The result of this custom unmarshalling is an interface pointer, which is then marshalled using standard marshalling into an output buffer in step 1228. The output buffer containing the marshalled interface pointer that has been marshalled using standard marshalling is then returned through the service control managers 1207 and 1216 to the client program 1201.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method in a computer system for invoking server code that is stored in a dynamically linkable library, the computer system having a client process that requests invocation of the server code, the method comprising:

receiving from the client process a request to invoke the server code;

in response to the received request, invoking a surrogate process with a reference to the dynamically linkable library that stores the server code, wherein the surrogate process is an independently executable process for loading server code that is stored in a dynamically linkable library and that can instantiate an object;

loading the referenced dynamically linkable library into the invoked surrogate process;

executing the server code stored in the loaded dynamically linkable library; and returning to the client process a reference to the executing server code, the returned reference being used by the client process to invoke the server code executing in the surrogate process by executing the same client code that is used to invoke the server code when the server code is executing in the client process.

2. The method of claim 1, the computer system being connected to a remote computer system, and wherein the surrogate process is executed on the remote computer system.

3. The method of claim 2, the server code implemented according to a first architectural model, the client process having client code implemented according to a second architectural model that is incompatible with the first architectural model, the remote computer system having an instruction set that implements the first architectural model of the server code, and wherein the executing of the surrogate process on the remote computer system is performed in order to enable the client code to invoke the server code implemented according to the incompatible architectural model.

4. The method of claim 1, the computer system having a service control manager responsible for process invocation, and wherein receiving from the client process the request to invoke the server code and invoking the surrogate process is performed under the control of the service control manager.

5. The method of claim 4 wherein the computer system is connected to a remote computer system having a second service control manager process, and wherein invoking the surrogate process further comprises:
forwarding the request to invoke the server code to the second service control manager process; and
under control of the second service control manager process, invoking the surrogate process on the remote computer system.

6. The method of claim 4, the computer system being connected to a remote computer system, and wherein the surrogate process is executed on the remote computer system.

7. The method of claim 1, further comprising, under control of the client process, invoking the server code using the returned reference to the executing server code by using the same client code that is used to invoke the server code when the server code is instead loaded in the client process.

8. The method of claim 1, the returning to the client process the reference to the executing server code further comprising:
creating and registering a binding handle that connects directly to the server code; and
returning to the client process a reference to the created binding handle as the reference to the executing server code.

9. A method in a computer system for invoking server code that is stored in a dynamically linkable library, the computer system having a client process that requests invocation of the server code, the method comprising:
receiving from the client process a request to invoke the server code;
in response to the received request, invoking a surrogate process with a reference to the dynamically linkable library that stores the server code, wherein the surrogate process is an independently executable process for loading server code that is stored in a dynamically linkable library and that can instantiate an object;
loading the referenced dynamically linkable library into the invoked surrogate process;
executing the server code stored in the loaded dynamically linkable library;
creating, in the surrogate process, an object instance of a requested type of object implemented by code stored in the referenced dynamically linkable library; and
returning to the client process a reference to a requested interface of the created object instance in the surrogate process, the returned reference being used by the client process to access the requested interface of the created object instance in the surrogate process by executing the same client code that is used to access the requested interface when an instance of the requested type of object is created in the client process.

10. The method of claim 9, further comprising:
under control of the client process,
using the returned reference to the requested interface, requesting invocation of a method of the requested interface; and
transparently forwarding the method invocation request to the surrogate process, which transparently forwards the method invocation request to the created object instance.

11. The method of claim 10, the computer system being connected to a remote computer system, and wherein the surrogate process is executed on the remote computer system and transparently forwarding the method invocation request to the surrogate process transparently forwards the method invocation request to the surrogate process executing on the remote computer system.

12. The method of claim 9, the requested type of object having persistent data and further comprising, before returning the reference to the requested interface, the step of loading the persistent data into the created object instance.

13. The method of claim 9, further comprising, before returning the reference to the requested interface, initializing the created object instance.

14. The method of claim 9, the returning to the client process the reference to the requested interface of the created object instance in the surrogate process further comprising:
creating and registering a binding handle that connects directly to the server code that implements the requested interface of the created object instance; and
returning to the client process a reference to the created binding handle as the reference to the requested interface of the created object instance.

15. A method in a computer system for invoking server code that is stored in a dynamically linkable library, the method comprising:
receiving from a first process a request to invoke the server code;
in response to the received request, invoking a surrogate process with a reference to the dynamically linkable library that stores the server code and with a class identifier, the class identifier identifying a class of objects with common behavior and corresponding to a class factory object, the class factory object implemented by the stored server code and having a creation method for creating an object of the class of objects identified by the class identifier, wherein the surrogate process is an independently executable process for loading server code that is stored in a dynamically linkable library and that can instantiate an object;
loading the referenced dynamically linkable library into the invoked surrogate process;
executing the server code stored in the loaded dynamically linkable library;
creating an instance of the class factory object that corresponds to the class identifier within the invoked surrogate process; and
registering the created class factory object instance so that other processes can create object instances of the class of objects identified by the class identifier using the creation method without knowledge that the class factory object instance is instantiated in a different process, each created object instance being implemented by code that is stored in the linkable library that is loaded in the surrogate process.

16. The method of claim 15, further comprising:

receiving a request from requesting code to create an object instance of the class of objects identified by the class identifier; and in response to the request, invoking the creation method of the registered class factory object instance within the surrogate process without the requesting code having knowledge that the creation method is being executed within the surrogate process.

17. The method of claim 16 wherein the requesting code to create the object instance is received from a process other than the surrogate process, and further comprising:

after receiving the request to create the object instance, determining whether a class factory object corresponding to the class identifier is registered; and only when it is determined that the corresponding class factory object is registered, performing the invoking of the creation method of the registered class factory object instance within the surrogate process.

18. The method of claim 16, the computer system being connected to a remote computer system, and wherein the surrogate process is executed on the remote computer system.

19. A method in a computer system for invoking a server application having server code, the method comprising the computer-implemented steps of:

receiving from a first process a request to invoke the server application;

in response to the received request, invoking a surrogate process with a reference to a dynamically linkable library that contains the server code and with a class identifier, the class identifier identifying a class of objects with common behavior and corresponding to a class factory object, the class factory object implemented by the contained server code and containing a creation method for creating an object of the class of objects identified by the class identifier;

loading the referenced dynamically linkable library into the surrogate process;

executing the server code contained in the loaded dynamically linkable library:

creating an instance of the class factory object within the surrogate process corresponding to the class identifier;

registering the created class factory object instance so that other processes can create object instances of the class of objects identified by the class identifier using the creation method without knowledge that the class factory object instance is instantiated in a different process, each created object instance being implemented by code in the linkable library loaded in the surrogate process;

receiving a request from requesting code to create an object instance of the class of objects identified by the class identifier; and in response to the request, invoking the creation method of the registered class factory object instance within the surrogate process without the requesting code having knowledge that the creation method is being executed within the surrogate process, wherein the first process from which the request to invoke the server application is received is under the control of a first program, the first program belonging to a security identity for determining the access rights of the first program, wherein the requesting code from which the request to create an object instance is received is part of a second program, the second program belonging to a security identity for determining the access rights of the second program, and wherein invoking the creation method of the registered class factory object instance within the surrogate process is performed only when the first and second program belong to the same security identity.

20. The method of claim 15, the computer system having a service control manager process responsible for process invocation, and wherein invoking the surrogate process is performed under the control of the service control manager process.

21. The method of claim 20, the computer system being connected to a remote computer system, and wherein the surrogate process is executed on the remote computer system.

22. The method of claim 20 wherein the computer system is connected to a remote computer system having a second service control manager process, and wherein the step of invoking the surrogate process further comprises:

forwarding the request to invoke the server code to the second service control manager process; and under control of the second service control manager process, invoking the surrogate process on the remote computer system.

23. The method of claim 15, the registering of the created class factory object instance further comprising creating and registering a binding handle to the server code that implements the created class factory object instance.

24. The method of claim 15, further comprising:

creating an object instance of the class of objects identified by the class identifier; and returning to the first process an indicator to a requested interface of the created object instance, the returned indicator being used by the first process to transparently invoke methods of the requested interface of the created object instance instantiated in the surrogate process.

25. The method of claim 24 wherein the computer system is connected to a remote computer system and wherein the surrogate process is executed on the remote computer system and, further comprising:

receiving a request to create a second object instance of the class of objects identified by the class identifier; and in response to the received request, transparently invoking the creation method of the registered class factory object instance within the surrogate process.

26. The method of claim 25 wherein the first process from which the request to invoke the server code is received is under the control of a first program, the first program belonging to a security identity for determining the access rights of the first program, wherein the request to create a second object instance is received from a second program, the second program belonging to a security identity for determining the access rights of the second program, and wherein transparently invoking the creation method of the registered class factory object instance within the surrogate process is performed only when the first and second program belong to the same security identity.

27. The method of claim 15 wherein the computer system is connected to a remote computer system, and wherein the invoking of the surrogate process in response to the received request launches the surrogate process on the remote computer system passing the reference to the linkable library and passing the class identifier.

28. A method in a computer system for invoking server code, the method comprising:

receiving a request from a client process to invoke the server code;

in response to the received request, determining whether the server code is already executing;

when it is determined that the server application is not already executing, determining whether a standalone executable program for the server code exists;

when it is determined that no standalone executable program exists, determining whether there exists executable code for the server code that is stored in a linkable library and whether it is desired to execute the server code in a process other than the client process;

when it is determined that executable code for the server code exists in a linkable library and it is desired to execute the server application in the process other than the client process, invoking a surrogate process with a reference to the linkable library and a list of class identifiers, each class identifier identifying a class of objects with common behavior and corresponding to a class factory object, each class factory object implemented by code that is stored in the referenced linkable library and having a creation method for creating an object of the class of objects identified by the class identifier, wherein the surrogate process is an independently executable process for loading server code that is stored in a dynamically linkable library and that can instantiate an object; and under control of the invoked surrogate process,
loading the referenced linkable library; and
for each class identifier in the list of class object identifiers,
creating an instance of the corresponding class factory object within the surrogate process; and
registering the created class factory object instance so that other processes can create object instances of the class of objects identified by the class identifier using the creation method.

29. The method of claim 28 wherein the determining of whether it is desired to execute the server application in a process other than the client process is determined at the discretion of the server application.

30. The method of claim 28 wherein the determining of whether it is desired to execute the server application in a process other than the client process is determined at the discretion of the client process.

31. The method of claim 28, further comprising, after determining whether a standalone executable program for the server application exists, when it is determined that the standalone executable program exists, launching the standalone executable program.

32. The method of claim 28, the computer system having a service control manager responsible for process invocation, and wherein the determining of what code to invoke as the server code and invoking the determined code are performed under the control of the service control manager.

33. The method of claim 28, the computer system being connected to a remote computer system, and wherein the surrogate process is executed on the remote computer system.

34. A method in a computer system for invoking a plurality of server applications, each server application implemented by executable server code that is stored in a linkable library, the method comprising:

in response to a request to invoke a first server application, invoking a surrogate process with a reference to the linkable library that stores the server code that implements the first server application; and under control of the surrogate process, loading the referenced linkable library that stores the server code that implements the first server application;

in response to a request to invoke a second server application, determining whether the linkable library that stores the server code that implements the second server application contains trusted is code;

when it is determined that the linkable library that stores the server code that implements the second server application contains trusted code, requesting the already executing surrogate process to load the linkable library that contains trusted code that implements the second server application; and loading the linkable library that contains the trusted code that implements the second server application into the already executing surrogate process.

35. The method of claim 34, further comprising:

when it is determined that the linkable library that stores the server code that implements the second server application does not contain trusted code, invoking a second surrogate process; and under control of the second surrogate process, loading the referenced linkable library that stores the server code that implements the second server application.

36. The method of claim 34 wherein the determining of whether the linkable library that stores the server code that implements the second server application contains trusted code further comprises determining whether the linkable library that stores the server code that implements the second server application can be executed in the same process as the linkable library that stores the server code that implements the first server application.

37. The method of claim 36 wherein the request to invoke the first server application is performed under the control of a first program, the first program belonging to a security identity for determining the access rights of the first program, wherein the request to invoke the second server application is performed under the control of a second program, the second program belonging to a security identity for determining the access rights of the second program, and wherein the determining of whether the linkable library that stores the server code that implements the second server application contains trusted code further comprises:

determining whether the first program belongs to the same security identity as the second program; and when it is determined that the first and second programs belong to the same security identity, reaching a result that the linkable library that stores the server code that implements the second server application contains trusted code.

38. The method of claim 36 wherein the determining of whether the stored code that implements the second server application can be executed in the same process is performed by table look up.

39. The method of claim 34 wherein the request to invoke the first server application is performed under the control of a first program, the first program belonging to a security identity for determining the access rights of the first program, wherein the request to invoke the second server application is performed under the control of a second program, the second program belonging to a security identity for determining the access rights of the second program, and wherein the determining of whether the linkable library that stores the server code that implements the second server application contains trusted code comprises:

determining whether the first program belongs to the same security identity as the second program;

when it is determined that the first and second programs belong to the same security identity, reaching a result that the linkable library that stores the server code that implements the second server application contains trusted code.

40. The method of claim 34, the computer system having a service control manager responsible for process invocation, and wherein invoking the surrogate process is performed under the control of the service control manager.

41. The method of claim 40, the computer system being connected to a remote computer system, and wherein the surrogate process is executed on the remote computer system.

42. The method of claim 40 wherein the computer system is connected to a remote computer system having a second service control manager process, and wherein the step of invoking the surrogate process further comprises the substeps of:

forwarding the request to invoke the server application to the second service control manager process; and under control of the second service control manager process, invoking the surrogate process on the remote computer system.

43. The method of claim 34, the computer system being connected to a remote computer system, and wherein the surrogate process is executed on the remote computer system.

44. The method of claim 34 wherein requesting the already executing surrogate process to load the linkable library that contains the trusted code that implements the second server application further comprises:

providing a list of class identifiers to the already executing surrogate process, each class identifier identifying a class of objects with common behavior and corresponding to a class factory object, each class factory object implemented by code residing in the linkable library that contains the trusted code that implements the second server application, each class factory containing a creation method for creating an object of the class of objects identified by the class identifier; and wherein the loading of the linkable library that contains the trusted code that implements the second server application into the surrogate process further comprises:

for each class identifier in the provided list of class object identifiers, creating an instance of the corresponding class factory object within the surrogate process; and registering the created class factory object instance so that other processes can create object instances of the class of objects identified by the class identifier using the creation method.

45. The method of claim 44, further comprising:

receiving a request from requesting code to create an object instance of the class of objects identified by a requested class identifier; and in response to the received request to create the object instance, invoking the creation method of the registered class factory object instance within the surrogate process without the requesting code having knowledge that the creation method is being executed within the surrogate process.

46. A method in a computer system for unmarshaling a marshalled object, the marshalled object containing a class identifier identifying a class of objects with common behavior and unmarshaling code, the unmarshaling code being implemented by server code that corresponds to the class identifier, the method comprising:

determining whether custom unmarshaling is required to unmarshal the marshalled object, wherein custom unmarshaling refers to unmarshaling code that implements an unmarshaling process that is specific to the server code;

when it is determined that custom unmarshaling is required, determining the class identifier of the marshalled object;

determining whether there exists a linkable library that contains executable server code that corresponds to the determined class identifier;

when it is determined that the linkable library exists, invoking a surrogate process with a reference to the linkable library, wherein the surrogate process is an independently executable process for loading server code that is stored in a dynamically linkable library and that can instantiate an object; and under control of the invoked surrogate process, loading the linkable library and executing the custom unmarshaling code in the loaded linkable library to unmarshal the marshalled object in a server code-specific manner.

47. The method of claim 46, the class identifier of the marshalled object identifying a class factory object, and further comprising, under control of the surrogate process, creating an instance within the surrogate process of the class factory object identified by the determined class object identifier.

48. The method of claim 47, the created class factory object instance having a creation method for creating an object of the class of objects identified by the determined class identifier, and further comprising registering the created class factory object instance so that other processes can use the creation method to create object instances of the class of objects identified by the determined class identifier without knowledge that the class factory object instance is instantiated in a different process.

49. The method of claim 46, the class identifier of the marshalled object identifying a class factory object, the class factory object having a creation method for creating an object of the class of objects identified by the class identifier and further comprising:

under control of the surrogate process, creating an instance of the class factory object;

using the creation method of the created class factory object to create an object instance of the class of objects identified by the determined class identifier;

copying data from the marshalled object into the created object instance; and returning an indicator to a requested interface of the created object instance.

50. A method in a computer system for invoking a server application having server code implemented according to a first architectural model from client code implemented according to a second architectural model, the client code executing in a client process, the method comprising the computer-implemented steps of:

receiving from the client process a request to invoke the server application;

in response to the received request, determining whether the first architectural model of the server code is compatible with the second architectural model of the client code, such that the server code can be executed in the client process;

when it is determined that the first architectural model of the server code is not compatible and cannot be executed in the client process, invoking a surrogate process with a reference to a dynamically linkable library that contains the server code implemented according to the first architectural model, the surrogate process providing an emulation of a computer system having an instruction set that implements the first architectural model;

loading the referenced dynamically linkable library into the surrogate process;

within the surrogate process, executing the server code implemented according to the first architectural model; and returning to the client process a reference to the executing server code, the client process using the returned reference to transparently access the server application as if the server code were executing in the client process.

51. The method of claim 50, the computer system being connected to a remote computer system, and wherein the step of invoking the surrogate process invokes and executes the surrogate process on the remote computer system.

52. A computer system for invoking server code that is stored in a dynamically linkable library, the computer system comprising:

a surrogate process that is an independently executable process for loading server code that is stored in a dynamically linkable library and that can instantiate an object, and that, in response to being invoked,
loads the dynamically linkable library that stores the server code;
executes the server code; and
returns a reference to a binding handle for the executing server code that can be transparently used by a second process to further invoke the server code without knowledge that the server code is being executed in the surrogate process; and an invocation mechanism that, in response to a request to invoke the server code, invokes the surrogate process with a reference to the dynamically linkable library.

53. A computer system for invoking server code that is stored in a dynamically linkable library, the computer system comprising:

a class factory object identified by class identifier and implemented by server code stored in the linkable library, the class identifier identifying a class of objects with common behavior and containing a creation method for creating an object of the class;

a surrogate process that is an independently executable process for loading server code that is stored in a dynamically linkable library and that can instantiate an object, and that in response to being invoked,
loads the linkable library that stores the server code;
creates an instance of the class factory object within the surrogate process;
registers a binding handle for the created class factory object instance so that other processes can create object instances of the class without knowledge that the class factory object and creation method is executing in the surrogate process; and an invocation mechanism that, in response to a request to invoke the server code, invokes the surrogate process with a reference to the linkable library and the class identifier.

54. The system of claim 53 wherein the surrogate process is invoked on a remote computer system.

55. The system of claim 53 wherein the surrogate process further uses the creation method of the created class factory object to create an instance of an object of the class of objects identified by the class identifier and returns a reference to a binding handle for the created object instance.

56. A computer system for invoking a plurality of server applications, each server application implemented by executable code contained in a linkable library, the computer system comprising:

a surrogate process that,
in response to invocation, loads the linkable library containing code implementing a first server application and,
in response to a request to load the linkable library implementing a second server application, loads the linkable library containing code implementing the second server application; and an invocation mechanism that,
in response to a request to invoke the first server application, invokes the surrogate process with a reference to the linkable library containing code implementing the first server application,
in response to a request to invoke the second server application, determines whether the linkable library containing code implementing the second server application contains trusted code, and when the invocation mechanism determines that the linkable library containing code implementing the second server application contains trusted code, requests the invoked surrogate process to load the linkable library containing the trusted code implementing the second server application.

* * * * *